(12) United States Patent
Chapman et al.

(10) Patent No.: US 6,628,609 B2
(45) Date of Patent: Sep. 30, 2003

(54) METHOD AND APPARATUS FOR SIMPLE IP-LAYER BANDWIDTH ALLOCATION USING INGRESS CONTROL OF EGRESS BANDWIDTH

(75) Inventors: Alan Stanley John Chapman, Kanata (CA); Hsiang-Tsung Kung, Lexington, MA (US)

(73) Assignee: Nortel Networks Limited, St-Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,845

(22) Filed: Apr. 30, 1998

(65) Prior Publication Data

US 2003/0103450 A1 Jun. 5, 2003

(51) Int. Cl.$^7$ .............................. H04J 3/14; H04L 12/56
(52) U.S. Cl. ........................ 370/229; 370/235; 370/413
(58) Field of Search ................................. 370/229, 230, 370/231–232, 234, 235, 236.1, 236.2, 412, 413–416, 420

(56) References Cited

U.S. PATENT DOCUMENTS

| | | | | |
|---|---|---|---|---|
| 5,768,258 A | * | 6/1998 | Van As et al. | 370/236 |
| 6,052,361 A | * | 4/2000 | Ansari et al. | 370/235 |
| 6,118,761 A | * | 9/2000 | Kalkunte et al. | 370/229 |
| 6,229,789 B1 | * | 5/2001 | Simpson et al. | 370/230 |

OTHER PUBLICATIONS

"Link–sharing and Resource Management Models for Packet Networks" Sally Floyd and Van Jacobson 6/95.
Nichols, K., Jacobson, V., Zhang, L., "A Two–bit Differentiated Services Architecture for the Internet", Internet Engineering Task Force INTERNET–DRAFT, Nov. 1997, www.tisl.ukans.edu/~rsarav/projects/networking/ipqos/two– bit.txt), 21 pages.

* cited by examiner

Primary Examiner—Wellington Chin
Assistant Examiner—Maikhanh Tran

(57) ABSTRACT

The present invention relates to a switch for processing data units, such as IP data packets. The switch can be implemented as a router that includes a plurality of input ports, a plurality of output ports and a switch fabric capable of establishing logical pathways to interconnect a certain input port with a certain output port. A characterizing element of the router is its ability to control bandwidth usage on a basis of a logical pathway. This prevents congestion to occur in the switch fabric and also at the level of the output ports. For every active logical pathway the router sets-up a bandwidth control mechanism including at least one queue to hold data units received at an input port. The bandwidth control mechanism performs an accounting operation to determine the average bandwidth usage and if less than a threshold requests for releasing data units in the switch fabric are sent to the switch fabric controller. When the threshold is exceeded the bandwidth control mechanism stops sending requests for service to the switch fabric controller. The system also supports priorities. Instead of stopping the issuance of signals requesting release of data packets the priority level of the queue (reflected in a priority field in the signal requesting release of a data packet) changes from HI to LO. The switch fabric controller is designed to recognize priority requests and will accept LO priority requests only when there are no other HI priority requests pending. The present invention also provides a data transport device which includes a plurality of nodes interconnected by a physical link that establishes two ring-shaped paths on which data is transported on opposite directions. Each node is capable of sending a control message to the upstream node to advise the upstream node of the data carrying requirements of the node at which the message has originated. The upstream node can then throttle the introduction of data in the paths to preserve capacity that can be used by the downstream nodes.

55 Claims, 13 Drawing Sheets

| Port | Minimum Bandwidth | Maximum Bandwidth |
|---|---|---|
| A | 1 Mb/s | 5 Mb/s |
| B | 3 Mb/s | 10 Mb/s |
| C | 5 Mb/s | 10 Mb/s |

Figure 4

Bandwidth Control Mechanism for a Logical Pathway

Admission Control Mechanism for an Input Port

METHOD AND APPARATUS FOR SIMPLE IP-LAYER BANDWIDTH ALLOCATION USING INGRESS CONTROL OF EGRESS BANDWIDTH

FIELD OF THE INVENTION

The present invention relates to the field of data communication networks.

BACKGROUND OF THE INVENTION

The following paragraphs give definitions of terms relevant to this document:

Physical Link: A single point-to-point serial transmission link between two nodes in a network (such as between two routers or between a router and a host machine).

Physical Output Port: The output port of a switch, such as a router that supports at least one physical link.

Logical Link: A point-to-point traffic path between two switches that is composed of multiple parallel physical links and appears from a routing point of view to be one link.

Logical Output Port: The collection of physical output ports that support the physical links of a logical link.

Logical Pathway: A pathway internal to a switch connecting an input port to an output port.

Internet Protocol (IP): A library of routines called on by various network communications applications. IP is responsible for transporting packets of data from node to node. It forwards each packet based on a four-byte destination address (IP number).

Switch: The term switch refers to a single router or packet switch within a communications network. Alternatively, it can refer to a contained network with a determined population of inputs and outputs.

A typical data communication network operates in a connectionless mode whereby there is no negotiation between the transmitter receiver and the network with regard to the type or quantity of traffic that is to be sent. The transmitter simply sends the traffic on the network, and relies on the network components to deliver that traffic to the receiver accurately. These network components consist typically of routing nodes (also known as routers or switches) joined by physical links. The main function of the routing nodes is to direct incoming packets to the appropriate outgoing links. In the event of too much traffic arriving for an outgoing link, the router applies specific policies to decide which traffic is forwarded and which is discarded. It is important that these policies are not subverted by having arbitrary loss of the forwarded traffic as it moves to the next point that implements the management policies. The term non-lossy, as applied to a router, implies that any traffic taken from an input port will be delivered without loss to the output port. As applied to a network, the term non-lossy implies that no traffic is lost between one routing node and the next routing node on the particular traffic path. Consequently, in the case of a non-lossy fabric the input port to a router or routing node has full control over which traffic gets discarded when congestion occurs.

Narrowing the focus to communication network applications that have adopted the Internet Protocol, it is important to note that traffic on the Internet is growing very fast. Not only is it expected that within a short time routes within the network will need multiple physical links to support higher transmission rates, but also that there will exist the necessity for bandwidth allocation to different classes of traffic, perhaps for a particular customer or a class of customer. Therefore, the general architecture for future IP-layer large switches will have the traffic buffered at many inputs while waiting for transfer to an output, where the outgoing link will most likely be a logical link consisting of multiple physical links. Indeed, future implementations of routing networks will have input ports connected to output ports that are geographically remote, and where those ports are connected by wide area non-lossy fabrics.

A particularly important objective to achieve within these future IP-layer networks will be the efficient management of bandwidth allocation. In other words, the network must ensure that the bandwidth available on an outgoing link be efficiently distributed between all traffic being routed through the switch fabric.

One solution to this problem is the protocol currently used to enforce a given bandwidth allocation for a traffic class, consisting of rate control exerted at the egress ports of the network. Output buffering is provided to allow for the mismatch between aggregate input rates and the assigned output rate. The output buffers take traffic from every input port and schedule the output of the various classes based on their allocation.

The problem with Egress based control of bandwidth is that ideally the output would like to take traffic from all ports as soon as it arrives. This requires that the output port receive traffic at a rate equal to the maximum sum of all the input rates. For large values of N (number of input ports) and input bandwidth rates, this is not economically sound and lower transfer rates are used. This in turn requires that the output port be selective in what traffic it transfers. In particular, the output port will give preference to traffic whose bandwidth allocation has not been satisfied and delay transferring traffic that can not currently be sent. This normally requires that some bandwidth be consumed in allowing output ports to discover the traffic status of input ports. The output buffered model is further complicated when multi-link trunks (logical links) are employed and the bandwidth allocation must be satisfied over the total bandwidth of the logical output port.

The background information herein clearly shows that there exists a need in the industry to provide a method for improving the management of IP-layer bandwidth allocation within a non-lossy data communication network arrangement.

OBJECTS AND STATEMENT OF THE INVENTION

An object of this invention is to provide a novel switch device capable of controlling the transport of data units, such as IP data packets, between the input ports and the output ports of the switch to limit the possibility of congestion that can arise at the output port level of the switch.

Another object of this invention is to provide a method for controlling the data units transport process in a switch to reduce the risk of internal congestion.

Another object of this invention is to provide a novel multi-node data transmission device, capable of transporting data units, such as IP data packets, capable of effecting inter-node negotiation for managing the transport of data units on a common data transmission pathway interconnecting the nodes.

Another object of this invention is to provide a method for transmitting data units over a multi-node data transmission device, by effecting inter-node negotiation.

As embodied and broadly described herein, the invention provides a switch for processing data units, said switch including:
- a plurality of input ports, each input port capable of receiving data units;
- a plurality of output ports, each output port capable of releasing data units from said switch;
- a switch fabric capable of selectively establishing a plurality of logical pathways between said input ports and said output ports, each logical pathway connecting a certain input port to a certain output port, whereby a data unit received at the certain input port can be transported to the certain output port on the logical pathway;
- a plurality of bandwidth control mechanisms for regulating the transport of data units in said switch, each bandwidth control mechanism being associated with a different logical pathway established through said switch fabric.

In a most preferred embodiment, the switch as defined in general terms above can be implemented as a router. Such a router forms a node in a network and it is used to receive data packets at input ports, analyze each packet to determine is destination and through a routing table select the output port through which the data packet is to be released so it can reach its intended destination. To reduce the likelihood of congestion, the router controls the release of data packets received at its input ports to the switch fabric independently for each logical pathway that can be established in the switch fabric. More specifically, when a logical pathway is established through the switch fabric a system of queues is set-up associated with that logical pathway such that the rate of data packets released into the switch fabric follows established bandwidth limits. By independently controlling the transport of data packets on every logical pathway, the aggregate data input rates to the switch fabric can be controlled so as not to exceed the limits of the assigned rates on outgoing links from the switch, thus avoiding traffic congestion on these links.

In a specific example, each input port of the router is provided with an independent controller that is capable of managing the data packets that arrive at that input port for release over a number of logical pathways that can be potentially enabled, connecting that input port to several output ports. Each controller includes a processor and a memory connected to the processor through a data bus. The memory holds the program element that includes instructions executed by the processor to provide the intended functionality. The memory is also capable of storing data on a temporary basis on which the processor operates during the execution of the program. In addition, the memory supports the creation of one or more queues that control the rate at which data packets are released in the switch fabric.

When a certain data packet is received at an input port, the local controller determines first the destination of the packet. This is done by reading the destination address field of the data packet. Once the address is determined, the output port through which the data packet is to be released is found by consulting a routing table mapping destination addresses with output ports. The routing table is a resource common to all the input ports. One possibility of implementation is to store the routing table in a central location. Alternatively, the routing table may also be stored locally, in the memory of each input port controller.

Once the output port through which the data packet is to be released is determined, the logical pathway through the switch fabric over which the data packet is to be transported towards the output port is known. The parameters that identify the logical pathway are simply the end points of the pathway, namely the identification of the input port and the identification of the output port. The data packet is then passed to the bandwidth control mechanism associated with this particular logical pathway. The bandwidth control mechanism includes at least one queue that receives the data packet and requests release of the data packet from the queue to the switch fabric at a rate determined to remain within the bandwidth limit allocated to this logical pathway. This allocation can be determined by consulting a table which maps each logical pathway with a bandwidth limit that the pathway should not exceed. This table is a setting of the router.

The rate at which the bandwidth control mechanism requests release of the data packets from the queue is determined by effecting an accounting operation for calculating average bandwidth used over time by the queue. The computed average bandwidth usage value is then compared to the bandwidth limit allocated to the particular logical pathway. If the bandwidth limit is exceeded, then the queue simply stops requesting release of the packets. This provides a local bandwidth control function allowing to manage the bandwidth usage over a particular logical pathway.

The bandwidth control mechanism described above may be described to accommodate traffic having bandwidth usage priority levels. For example, an input port may be receiving either C1 traffic class (minimum guaranteed bandwidth fraction without overflow) or C2 class traffic (minimum guaranteed fraction with possibility of controlled overflow). Each logical pathway joining one input port to one output port within the switch fabric has a minimum allocated fraction of the overall bandwidth value for that particular output port. The C1 class traffic can use all of its allocated fraction but is never allowed to exceed that fraction. In contrast, traffic of the C2 class can use the reaction entirely and overflow is possible, but it is controlled so as no to exceed a certain maximum allocated fraction of the egress bandwidth value also assigned to the logical pathway. The sum of all bandwidth fractions allocated to different logical pathways terminating in a single output port should not exceed the total reserved bandwidth value for that output port.

In a specific example, consider first a situation where a certain input port of the router receives only C1 class traffic. The queue for traffic of the C1 class is controlled such that data packets are released to the switch fabric at a rate that parallels the rate at which data packets enter the queue. This relationship holds true while the average bandwidth usage is below or equal to the bandwidth fraction allocated to the logical pathway receiving the data packets, during which time traffic is released with high priority. When this fraction is exceeded, overflow occurs and the queue stops requesting service. This means that the control mechanism stops sending request messages to the switch fabric controller to seek his authorization to release packets in the switch fabric. As such, the bandwidth control mechanism implements a self-regulating function to prevent the logical link from using more than its share of the available bandwidth. Objectively, when the queue stops requesting service this may cause packets to be dropped if the queue overflows at its input side. Once the accounting operation determines that the average bandwidth usage is below the assigned level the bandwidth control mechanism resumes the issuance of request signals to the switch fabric for releasing data packets.

In the situation where C2 class traffic is received at the input port the operation of the queue is somewhat different.

The linear relationship between the input rate and the rate at which high priority request signals are sent to the switch fabric controller holds until the reserved bandwidth fraction is reached. However, when the reserved bandwidth fraction is exceeded and overflow occurs, the queue does not stop requesting but rather sends requests with low priority status. The switch fabric controller recognizes the low priority status and will allow the release of a low priority data packet only when there are no other high priority data packets to send to the same physical output port.

Each request signal sent from a certain bandwidth control mechanism identifies the logical pathway that is associated with the bandwidth control mechanism and the mode in which the queue is operating, either high or low. Assume that the switch fabric controller receives requests from two bandwidth control mechanisms associated with different logical pathways, both pathways converging toward the same output port. If the configuration table for each logical pathway is accurately set there can be no possibility of overflow because that table assigns a certain fraction of the available bandwidth at the output port to each link. The bandwidth control mechanism of each link has a self regulating function thus enforcing the bandwidth limit at the level of each logical pathway. This implies that when a signal is issued to request a release of a high priority packet the switch fabric should be able to always accept that request. A request can be denied if the packet to be released is low priority.

The arrangement described above avoids congestion at the switch fabric level when the sum of the bandwidth fractions assigned to respective logical pathways does not exceed the total bandwidth an outgoing link from the switch an accommodate.

Another advantage of this system is that the switch fabric controller that is responsible for regulating the entry of the data packets from various input ports based on requests issued by respective bandwidth control mechanisms is of simple construction. It suffices to design the switch fabric controller to recognize different priority requests and accept the high priority requests, while accepting low priority request only when there are no high priority requests to meet.

As embodied and broadly described herein, the invention also provides a method for controlling the transport of data units in a switch, said switch comprising:
- a plurality of input ports, each input port capable of receiving data units;
- a plurality of output ports, each output port capable of releasing data units;
- a switch fabric capable of establishing a plurality of logical pathways between said input ports and said output ports, each logical pathway connecting a certain input port to a certain output port, whereby a data unit received at the certain input port can be transported to the certain output port on the logical pathway;
- said method comprising the step of controlling bandwidth usage of logical pathway independently from one another.

As embodied and broadly described herein, the invention provides a switch for processing data units, said switch including:
- a plurality of input ports, each input port capable of receiving data units;
- a plurality of output ports, each output port capable of releasing data units;
- a switch fabric capable of establishing a plurality of logical pathways between said input ports and said output ports, each logical pathway connecting a certain input port to a certain output port, whereby a data unit received at the certain input port can be transported to the certain output port on the logical pathway;
- means response to establishment of a logical pathway through said switch fabric to enable a bandwidth control mechanism to regulate bandwidth usage of the logical pathway.

As embodied and broadly described herein, the invention also comprises a method for managing the transport of data units in a switch, said switch comprising:
- a plurality of input ports, each input port capable of receiving data units;
- a plurality of output ports, each output port capable of releasing data units;
- a switch fabric capable of selectively establishing a plurality of logical pathways between said input ports and said output ports, each logical pathway connecting a certain input port to a certain output port, whereby a data unit received at the certain input port can be transported to the certain output port on the logical pathway;
- said method comprising the step of enabling a bandwidth control mechanism to regulate bandwidth usage of a certain logical pathway in response to establishment of the certain logical pathway through said switch fabric.

As embodied and broadly described herein, the invention further provides a multi-node data transmission device for transporting data units, said device including:
- a first node and a second node;
- a data transmission link interconnecting said nodes, said data transmission link defining a first and a second ring-shaped paths, each path permitting the transport of data from one node to another node;
- each of said first and second nodes being capable of introducing data units in one of said paths for the transport of the data to the other one of said nodes;
- each of said first and second nodes being capable of releasing data units received on at least one of said paths;
- one node being responsive to a control message issued by the other node to regulate the introduction of data in one of said pathways by said each node in dependence of the contents of said control message.

Preferably, the multi-node data transmission device as defined above can be used as a data transmission switch. Such switch can be a simple router or it can be implemented as a contained network. For the sake of simplicity, the following description will make reference to a router, being understood that the invention is not limited to this form of implementation.

The router typically includes input ports at which data units, such as IP data packets are received. After processing, those data packets are released through the output ports of the router. In a most preferred form of construction a pair input port/output port form a node. In a specific example, if the router includes three input ports and three output ports, this arrangement will create three nodes.

The nodes are connected by physical links that establish a double counter-rotating ring architecture. More specifically, such architecture has two ring-shaped paths that carry data in opposite (counter-rotating) directions. Most preferably, different physical links are used to support the two ring-shaped paths. However, it is also possible to implement the two ring-shaped paths over the same physical link.

An advantage of the double ring path arrangement is to provide an alternate routing capability should one path fails. In addition, this arrangement creates shorter routes between codes. For instance, in a device using three nodes, say A, B and C, node A desirous of sending a control message to node C, has two possibilities. The first one is to use the first path that imposes to the data a direction of travel A→B→C. This path is the longest since the data must pass through node B. On the other hand, if the data is sent over the second path imposing a direction of travel A→C→B, the data will reach its destination faster. This translates into a faster response time of the system and less bandwidth usage over certain internode sections of the paths.

The choice of the path over which data can be sent from one node to another can be made on the basis of the relative positions of the nodes. A simple implementation is to provide each node with a table that maps originating node/destination node pair with the corresponding path that establishes the shortest route. In the example of the three node structure mentioned earlier, the table contains three entries, each entry associating an originating node/destination node pair (AB, AC and BC) and a corresponding path over which the data is to be sent. Thus, when a node has data to send, either a control message or data packets, the table is consulted and the entry corresponding to the destination node found. The path to be used for the data transmission is then determined.

Most preferably, the management of the data transmission from one node to another node is the result of a cooperative relationship between the nodes. This is accomplished by providing each node with the ability to send to an upstream node a control message that identifies the fraction of the total data carrying capacity of the path that the downstream node (originator of the message) will need. The upstream node (receiver of the control message) can then throttle the insertion of the data packets in a way to maintain at least some data carrying capacity for the downstream node. From an implementation point of view, data is transmitted on each path by multiplexing. Each data packet sent from one node to another node occupies a time slot. The inter-node management of the usage of the path that is a common resource is effected on the basis of a batch of time slots. More specifically, each batch of time slots is divided in a certain fashion among the nodes to avoid data congestion at the nodes. In a specific form of construction, each node is designed to send to the upstream node, from where empty time slots will come, a control message indicating the number of time slots the node will need to meet commitments, such as a certain bandwidth or other priority based requirements. The upstream node (message receiver) determines if the empty slots it sees from the next level upstream node can satisfy its requirements and the requirements of the downstream node (originator of the message). In the affirmative, nothing is done and each node inserts data packets in the empty slots. If, however, the slots demand exceeds the available free slots, the upstream node (receiver of the message) will build and sent a control message to the upstream node of the next level requesting additional time slots. Additional time slots can be generated by a node when the node constrains its bandwidth usage. In other words a node can accommodate the needs of a downstream node by limiting the amount of data packets it inserts in the path. This ensures that enough empty slots are left for the downstream node to avoid blocking the transmission at that node entirely or limiting to the point where commitments can no longer be met.

Data insertion throttling can be made particularly when traffic of a minimum guaranteed bandwidth with possibility of overflow is being sent from one node to another node. This class of traffic, commonly referred to C2 is guaranteed a minimum bandwidth and if excess bandwidth is required, more bandwidth can be made available if it is available. In this case the throttling to free more time slots can be effected by effecting insertion of data packets in a path at a rate that does not exceed the minimum guaranteed bandwidth allocated to the traffic class. If, on the other hand, the downstream nodes do not use all the free time slots available, then the node can increase the insertion rate so that excess C2 class traffic can be passed.

In the case when all three nodes can receive C2 class traffic, the total capacity of the two ring-shaped paths should be at least equal to the total of the minimum guaranteed bandwidth of the three nodes. This should avoid congestion. Any excess capacity of the ring-shaped paths is competed for by the three nodes.

As embodied and broadly described herein, the invention also provides a method for data transmission, said method comprising the steps of:

providing a first node and a second node;

providing a data transmission link interconnecting said nodes, said data transmission link defining a first and a second ring-shaped paths, each path permitting the transport of data from one node to another node;

each of said first and second nodes being capable of introducing data in one of said paths for the transport of the data to the other one of said nodes;

each of said first and second nodes being capable of releasing data received on at least one of said paths;

generating at one node a control message;

transporting said control message over either one of said first and second ring-shaped paths to the other node;

regulating the introduction of data units in one of said paths at said other node independence of a contents of said control message.

As embodied and broadly described herein, the invention further provides a multi-node data transmission device for transporting data, said device including:

a first node and a second node;

a data transmission link interconnecting said nodes, said data transmission link defining a first and a second ring-shaped paths, each path permitting the transport of data from one node to another node;

each of said first, second and third nodes being capable of either one of introducing data in one of said paths for the transport of the data to the another one of said nodes and releasing data received on at least one of said paths;

data transported on said first path having a direction of propagation opposite the direction of propagation of data transported on said second path.

BRIEF DESCRIPTION OF THE DRAWINGS

FIG. 4 illustrates a configuration table for bandwidth allocation, in accordance with an embodiment of this invention;

DESCRIPTION OF PREFERRED EMBODIMENTS

Figure 1:
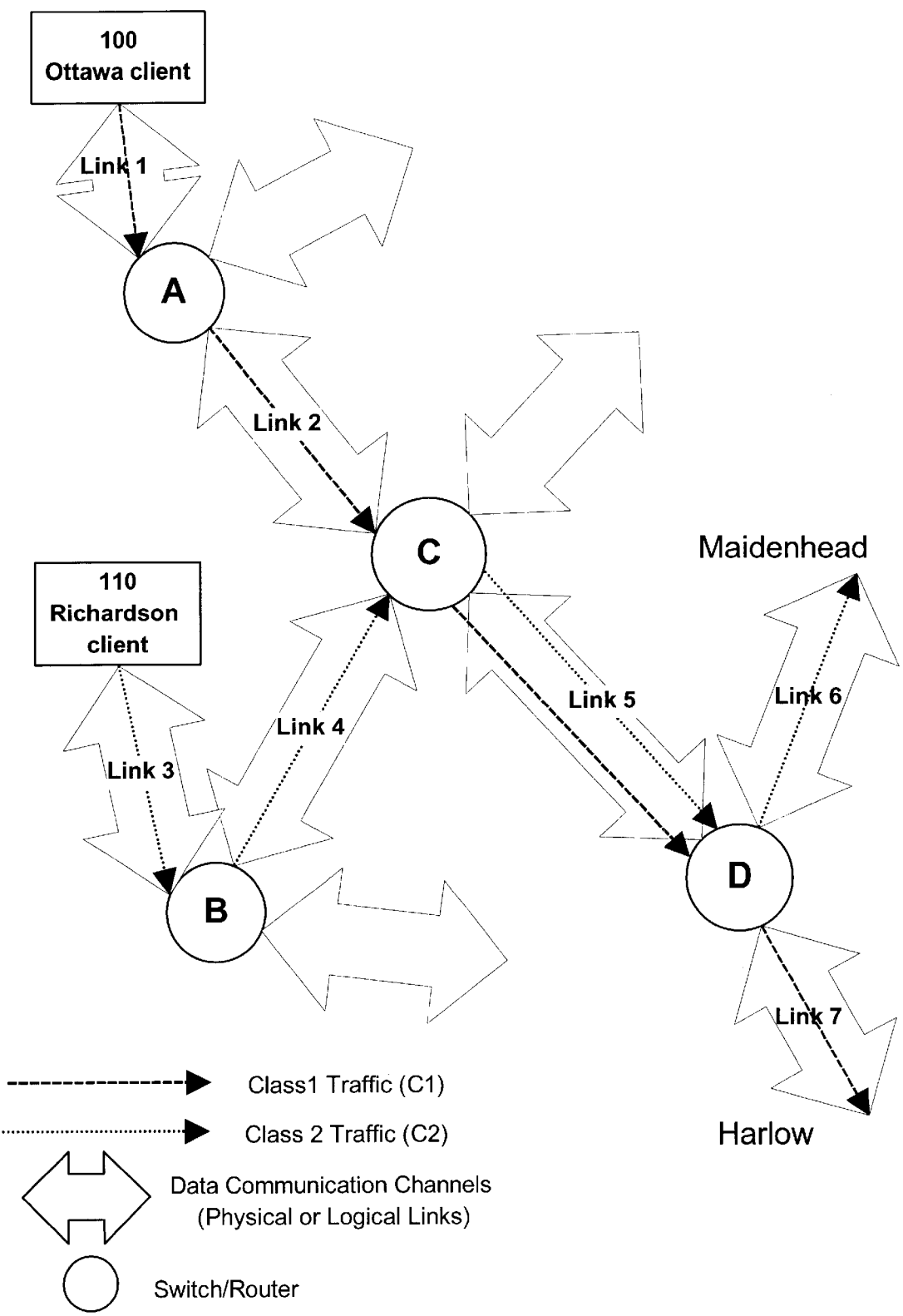
FIG. 1 is a block diagram of a data communications network.

FIG. 1 illustrates an example of a situation where two different classes of traffic travel through a data communications network that has adopted the Internet Protocol (IP) for its internetwork procedures. The two different classes of traffic present are C1 and C2. For a given logical egress port, C1 traffic is always able to use up the reserved amount of allocated bandwidth if it has traffic to send; however, this class is never allowed to use more than the reserved amount even if there is bandwidth available. As to the C2 class, for a given logical egress port, C2 traffic is always able to use up the reserved amount of bandwidth if it has traffic to send; however, if it has more traffic to send it can compete equally with other permitted classes for any available bandwidth, up to a certain maximum amount. In the case of FIG. 1, an Ottawa client 100 is ending traffic of class C1 (reserved bandwidth without overflow) to Harlow, whereas a Richardson client 110 is sending traffic of class C2 (reserved bandwidth with overflow) to Maidenhead. Client 100 traffic must travel on links 1, 2, 5 and 7, through switches A, C and D. Client 110 traffic must travel on links 3, 4, 5 and 6, through switches B, C and D. Therefore, the two streams of data overlap on link 5, flowing through switches C and D.

In the most basic sense, a switch consists of three main components: the input/output ports, the switch fabric and a controller. The controller may consist in a single central controller for the entire switch or, alternatively, may consist in a distributed control system with local controllers for each input port and, possibly, a separate fabric controller for the switch fabric.

The input/output ports interconnect the switch to users, other switches and other network elements. Data units, such as IP data packets, received as inputs are defined as ingress, while data units transmitted as outputs are defined as egress. The switch controller, either a central or distributed system, provides for the packet forwarding control, as well as the internal management of the switch, specifically the traffic scheduling and coordination within the switch fabric.

The switch fabric itself has the function of transferring data units between other functional blocks in the switch, using the plurality of logical pathways which make up the fabric itself. For example, user data units must be routed from the input port to output port over a particular logical pathway. The physical architecture of the switch fabric depends on the amount of traffic to be carried as well as the switch's location within the network. Examples of switch fabric taxonomy fall into two main categories, notably time division multiplexed (TDM) fabrics and space division multiplexed fabrics (SDM). The former category consists of either a shared memory design or a shared medium design. The latter category consists of either a single path design or a multiple path design. In a most preferred embodiment of this invention, the switch fabric architecture is modeled after a large space crossbar switch, which consists in a square array of individually-operated crosspoints, one for each input-output pair. In general, the crosspoints could be electromechanical relays or semiconductor switches. Each crosspoint has two possible states: cross (default) and bar. A connection, or logical pathway, between input port i and output port j is established by setting the (i,j)th cross point switch to the bar state. Alternatively, the switch fabric could be modeled after a common medium bus or ring, or some other variation of switch fabric architecture. As the physical taxonomy of switch fabric is well known to those skilled in the art, it will not be described in more detail.

In a most preferred embodiment of this invention, the switch controller consists in a distributed control system, with a local controller for each input port and a fabric controller for the switch fabric. The local controllers are responsible for the data handling and queuing, as well as the configuration and accounting management which determines the priority setting of the data queues prior to their sending a data unit release request to the fabric controller. The fabric controller is essentially concerned with getting data units from input ports to output ports, and is responsible for supporting priority such that it will move traffic from high priority requests before traffic from low priority requests. The fabric controller mechanism will not be described in more detail as it is well known to those who are skilled in the art.

Specific to this invention, the switch also includes a bandwidth control system responsible for regulating the bandwidth usage of the switch's outgoing links. Since traffic for a particular outgoing link may arrive from any one of the switch's input ports, using different logical pathways within the switch fabric, the bandwidth usage regulation for an outgoing link is actually applied to each logical pathway established in the switch fabric which terminates at the output port for the particular outgoing link.

Figure 8:
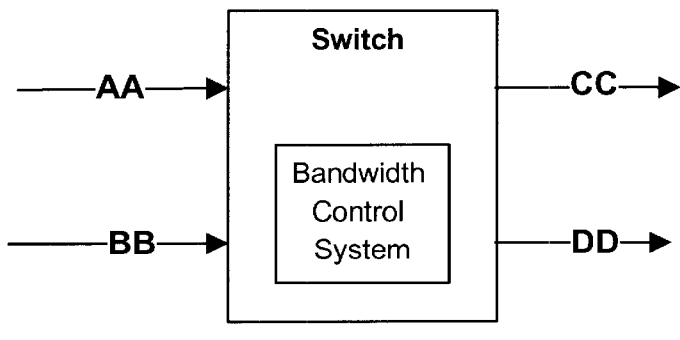
FIG. 8 is a block diagram representing a functional point of view of the bandwidth control system in accordance with this invention.
Figure 8:
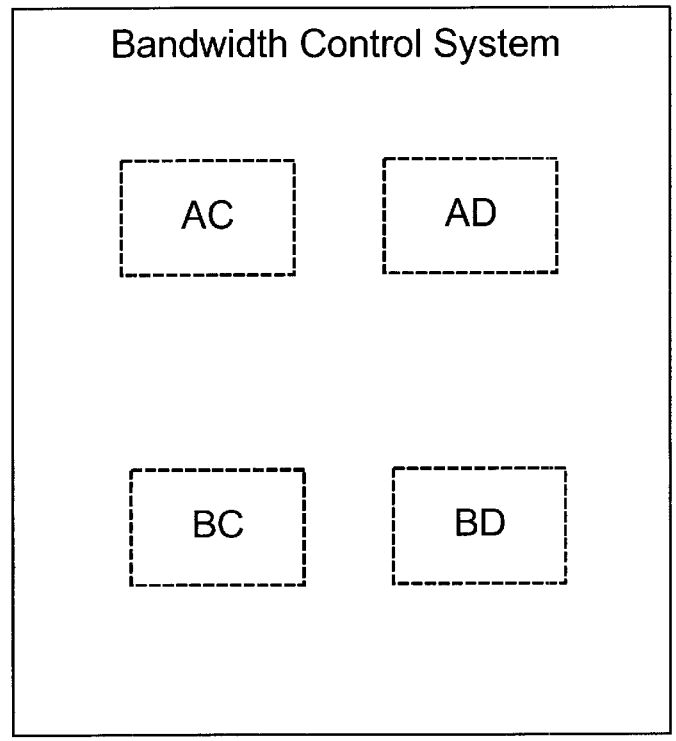
Figure 8:

The bandwidth control system structurally includes the witch fabric controller, the plurality of input port controllers and, for each logical pathway established in the switch fabric, at least one virtual queue set up in the local memory of the corresponding input port. From a functional point of view, the bandwidth control system includes a collection of bandwidth control mechanisms independent from one another, each associated with a particular logical pathway that can be established within the switch fabric. Each separate control mechanism is responsible for the bandwidth usage regulation on its associated logical pathway. FIG. 8 present a functional point of view of the bandwidth control system for a switch with two input ports AA and BB, and two output ports CC and DD. There are four possible logical pathways through the switch fabric, specifically AA to CC, AA to DD, BB to CC and BB to DD, each provided with its own bandwidth control mechanism, namely AC, AD, BC and BD.

In FIG. 1 the switches A, B, C, and D are implemented by large network routers, and will be referred to as such in the remainder of the description. The data units being routed through the communications network are IP data packets, and will also be referred to as such in the remainder of the description.

Figure 2:
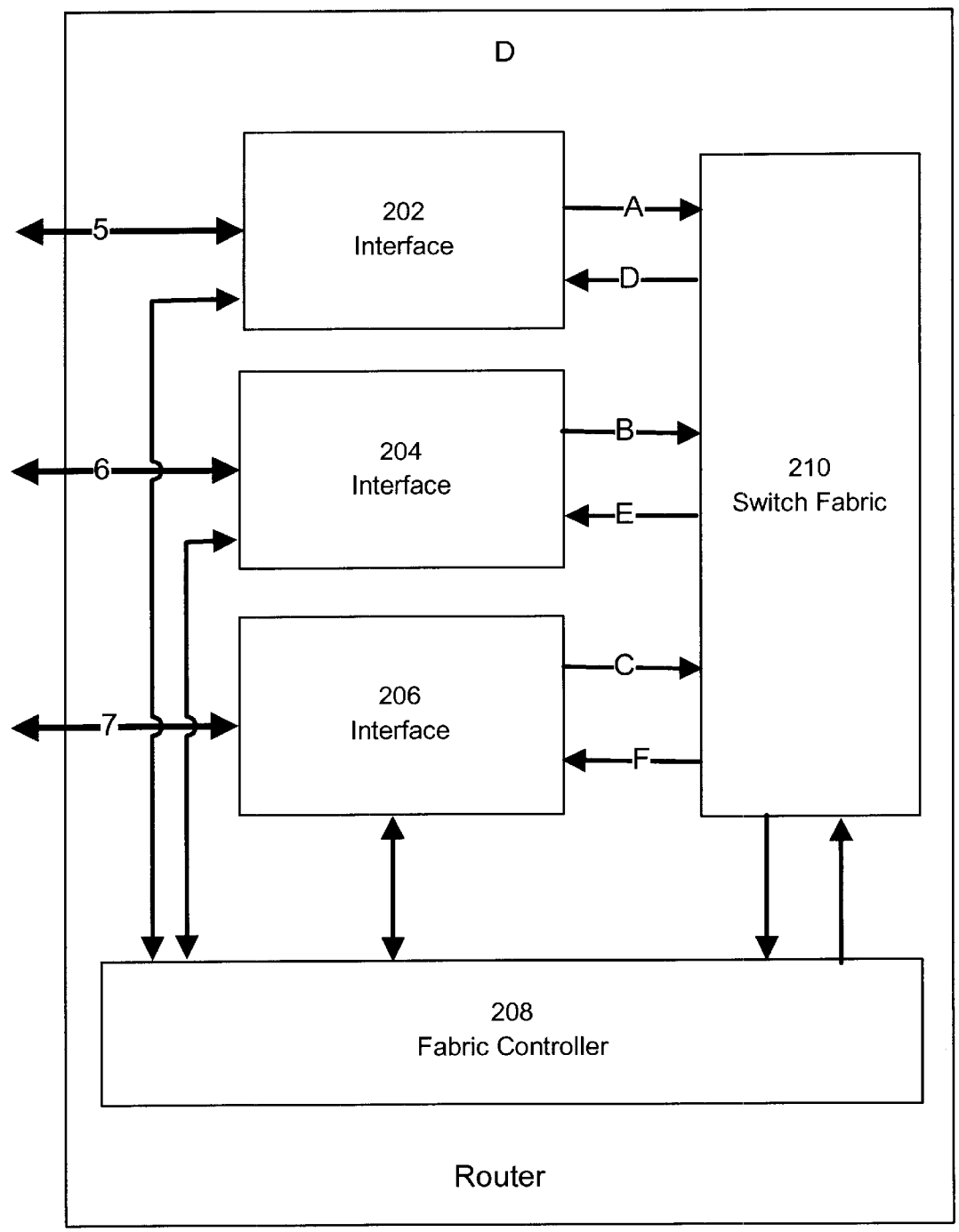
FIG. 2 is a block diagram of the structure of a router in accordance with the invention.

The structure of a router constructed in accordance with the present invention as shown in FIG. 2. More specifically, the diagram illustrates router D, which is comprised of interfaces 202, 204 and 206, a switch fabric controller 208 and the switch fabric 210 itself. The router has 6 ports, identified as port A, port B, port C, port D, port E and port F. These ports connect the router to physical links 5, 6 and 7, allowing data to be transported to other switches within the network. In the example shown, ports A, B and C are input ports on the physical inks 5, 6 and 7, respectively, while ports D, E and F are the output ports on those same physical links. The input ports are designed to receive data from their associated physical links, while the output ports are designed to transmit data over their associated physical links.

Figure 3:
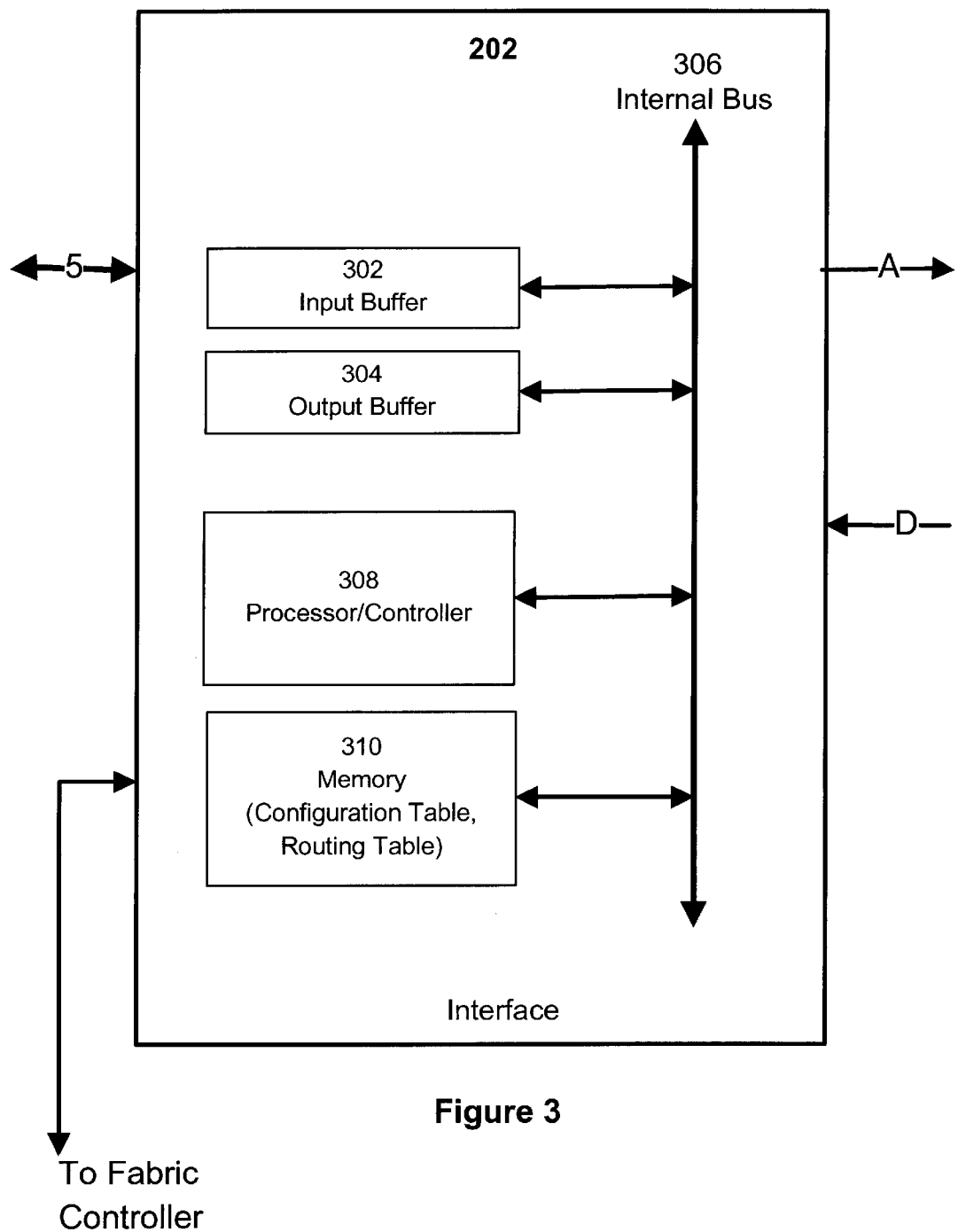
FIG. 3 is a block diagram of the structure of the interface of a router in accordance with the invention.

The interfaces 202, 204 and 206 interconnect various input and output ports to the physical links 5, 6 and 7, respectively. FIG. 3 shows the structure of these interfaces, specifically interface 202, in accordance with this invention. Each interface acts as a local controller for a particular input port, and comprises a processor 308, a memory 310, an input buffer 302 and an output buffer 304. The internal bus 306 interconnects these components, enabling data and control signals to be exchanged between them. As is the case for all three interfaces, the function of the interface 202 is to transmit incoming data packets to the internal bus 306 for transport to the memory 310 where they can be processed by the processor 308 before being sent over the switch fabric 210. On the output side, the interfaces are designed to accept data packets from the switch fabric 210 and impress the necessary electrical signals over the respective physical links so that the signal transmission can take effect. It is not deemed necessary to discuss the standard transmission operation of the interfaces in more detail because it is well known to those skilled in the art and is not critical to the success of the invention.

The input buffer 302 is a memory space of the FIFO type that can hold ingress data packets received at the input port of the associated physical link. The purpose of the buffer is to provide a temporary storage mechanism for holding the incoming data packets until a decision is made by the queuing and routing logic a to how those packets are to be handled. The output buffer 304 is also a memory space of the FIFO type, and it holds egress data packets to be output on a physical link. The physical configuration of the input and output buffers does not need to be described in detail because such components are readily available in the marketplace and the selection of the appropriate buffer mechanism suitable for use in the present invention is well within the reach of a person skilled in the art.

The memory 310 contains a program element that controls the operation of the interface, an important component of the bandwidth control system of the router. That program element is comprised of individual instructions that are executed by the processor 308, as will be described in detail below. In a preferred embodiment of this invention, the memory 310, local to a particular input port, holds the usual routing table that maps the destination addresses of incoming IP data packets to the router output ports. Alternatively, the routing table could be held in a central location, such as a router main memory, and shared by all input ports. It is not deemed necessary to further discuss the structure of the routing table here because this component is not critical for the success of the invention and also it wold be well known to a person skilled in the technological field to which the present invention belongs. The memory also provides random access storage, capable of holding data elements such as data packets that the processor 308 manipulates during the execution of the program. Finally, the memory contains a static configuration table of egress bandwidth allocation referenced by the processor 308 during program execution.

The memory 310 also supports the creation of queues, such queues constituting an integral component of the router's bandwidth control system. Based on the contents of a mapping table also held in memory, the processor 308 will dynamically create virtual queues within memory for the traffic for each particular class traveling through the switch fabric on a different logical pathway towards a particular output port, as described below. Specific to the example depicted in FIG. 1, interface 202 will have two virtual queue buffers set up in memory 310 as a result of the two different classes of traffic arriving at router D on physical link 5. Since the other two physical links are not receiving any data, their associated interfaces will not have any virtual queues set up in memory.

The router D interfaces have the ability to identify between different classes of traffic, recognize the traffic's intended logical pathway through the switch fabric and, on the basis of both of these characteristics, queue the data packets accordingly. The traffic in each queue is accounted for and, as a result, priorities of the different virtual queues are set before making a transmission request of the fabric controller 208. The latter recognizes the different queue priorities and accordingly determines and sets the transmission schedule of data packets being released from the queues to the switch fabric, which finally routes the data packets over their logical pathway to their corresponding output port. The use of such priority can greatly simplify the management of bandwidth allocation within the communications network.

Figure 7:
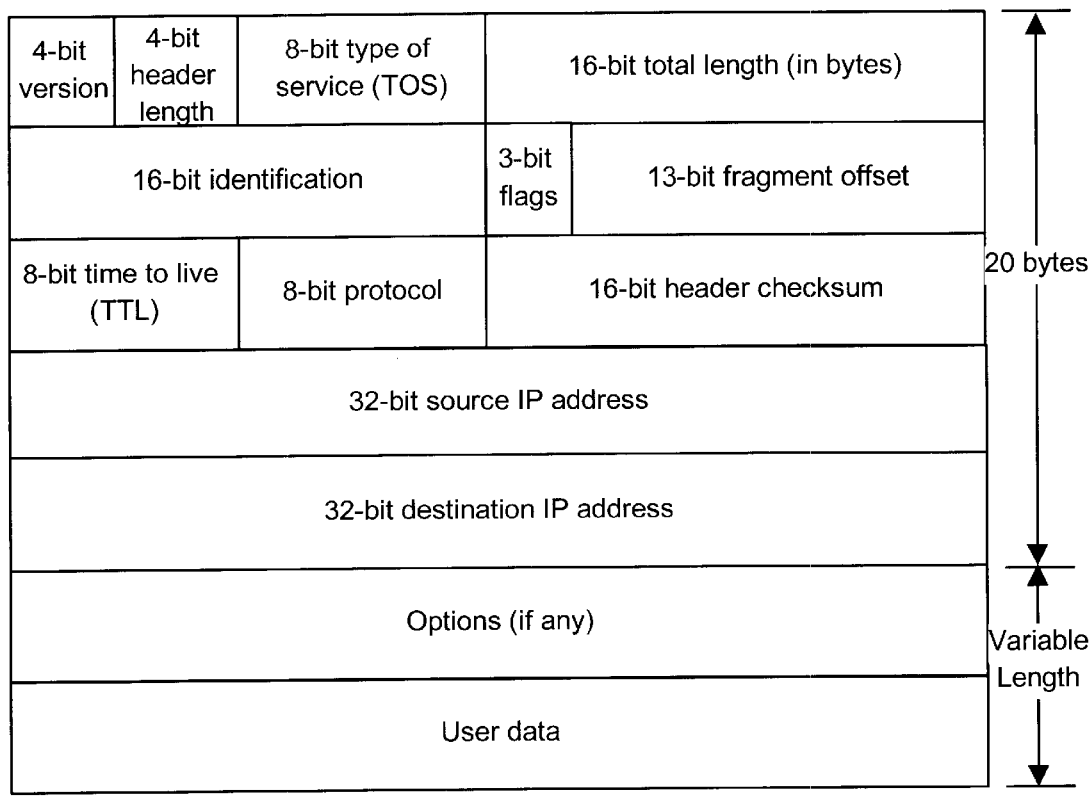
FIG. 7 is a diagram showing the format of an IP data packet.

In the example shown in FIG. 1, priority-based bandwidth allocation can be used at any of the routers in order to allocate outgoing link bandwidth between the two classes of traffic; however, it is only routers C and D that receive both classes of traffic. Assume of the sake of discussion that a certain IP data packet of type C2 arrives at router D, having been sent from router C. As the packet is traveling on the physical link 5, it will arrive at the input port of interface 202, notably input port A. The IP packet is placed in the input buffer 302 and the logic invoked to determine which class of traffic the data packet belongs to, as well as toward which output port the IP data packet is to be transported. This is effected by reading the corresponding fields in the IP data packet header depicted in FIG. 7. The routing table is then scanned in order to determine the output port assigned to the destination address read from the header. In this case the selected output port is connected to the physical link 6, namely output port E. The IP data packet is then transferred from the input buffer 302 to a virtual queue set up in memory 310. An accounting operation is then effected in order to determine the virtual queue's output rate, achieved over an averaging period.

The accounting operation is implemented through an algorithm for calculating average bandwidth used over time. Many such algorithms exist and are available within the marketplace and will not be described in detail, as they are well known to those who are skilled in the art. The result of the accounting operation is then compared to the values of the minimum and maximum allocated bandwidth setting for traffic traveling through the switch fabric over the logical pathway joining input port A to output port E.

The allocated bandwidth values for the different logical pathways are settings stored in a configuration table within the memory 310. FIG. 4 shows the configuration table for this example, where the bandwidth available on the outgoing link at output port E has been distributed between, and allocated to, the three logical pathways which connect output port E to the router's three input ports. The diagram shows that the input ports A, B and C have minimum allocated bandwidths of 1 Mb/s, 3 Mg/s and 5 Mg/s, respectively. The same three ports have maximum allocated bandwidths of 5 Mg/s, 10 Mb/s and 10 Mg/s, respectively. Although spare bandwidth is not available to C1 traffic, it is available to C2 traffic traveling on logical pathways through switch D, in which case the spare bandwidth would be competed for by the various types of C2 traffic, limited by the maximum allocated bandwidth settings for each logical pathway.

Based on the comparison between the accounting value and the bandwidth settings, a priority setting is established for the virtual queue, either HI or LO. If the accounting result is less than the minimum bandwidth setting, in this example 1 Mg/s, the queue's priority will be HI. If the accounting result shows that the queue's traffic flow has reached its minimum bandwidth setting, the queue's priority will be LO, until the flow reaches its maximum bandwidth, at which point the queue will stop requesting service of the fabric controller 208.

It is important to note that since C1 traffic has reserved bandwidth without overflow, its minimum bandwidth is also its maximum. Consequently, once a C1 queue accounts for an output rate of traffic equal to the minimum bandwidth allocated, the queue will stop requesting service from the fabric controller 208. Thus, requests for service for C1 class traffic are HI or none. This differs from C2 traffic, which has reserved bandwidth with overflow, because a C2 queue which accounts for an output rate of traffic equal to the minimum bandwidth allocated can continue competing for spare bandwidth with other C2 queues until it reaches its constraining maximum. When competing for spare bandwidth, a queue will have a LO priority setting.

Once the queue's priority setting has been established, that queue will make a request of the fabric controller 208 for packet transmission, said request being a signal comprising a queue identifier and identification of both the queue priority and the logical pathway to be used for transmission. The fabric controller recognizes the priority of requests arriving from the different input port queues, and will schedule data packet transmission permission for the various queues so as to regularly move traffic to a particular output port from HI priority requests before traffic form LO priority requests, as a LO request indicates that the queue traffic in question has already used up its minimum allocated bandwidth fraction on its logical pathway.

Structurally, the fabric controller 208 is comprised essentially of a memory and a processor. The memory contains a program element that determines the operation of the fabric controller. That program element is comprised of individual instructions that are executed by the processor, and which ensure that request priority is observed at all times. The memory also contains a dynamic storage medium of some sort, possibly a table or array, which maintains all traffic requests for transmission to each output port available over the switch fabric. In brief, the program element identifies the requesting queue, its priority and the destination output port for each received traffic request, and stores this request accordingly in the memory storage medium. Since the fabric controller recognizes the priority of traffic requests, the program will next compare all stored requests and send back to particular input port interfaces permission messages which ensure that higher priority traffic requests for a logical pathway ending in a particular output port are always granted before lower priority traffic traveling to the same output port is served.

When there are no HI traffic requests for any logical pathway ending in a particular output port, and only LO traffic requests are stored in memory, the fabric controller uses a round-robin scheduling policy to schedule packet release permissions, in order to allow equal competition between the LO priority traffic for any spare bandwidth available on the output port's physical link.

The actual release of an IP data packet to the switch fabric occurs when the fabric controller signals the queue to send out a packet, through the permission message sent from the fabric controller to the queue's interface. The signal used for this purpose can be simple and needs only the queue identifier to allow the interface of the addressed queue to properly recognize the signal.

Such priority scheduling is important when traffic from different input ports is traveling to the same output port, and therefore will be using the bandwidth available on a single outgoing link from the switch. Therefore, the above described method allows the bandwidth on an outgoing link to be controlled at the input ports by simple algorithms, which both regulate traffic congestion and ensure a particular class of traffic a minimum allocated bandwidth over a route.

Figure 5:
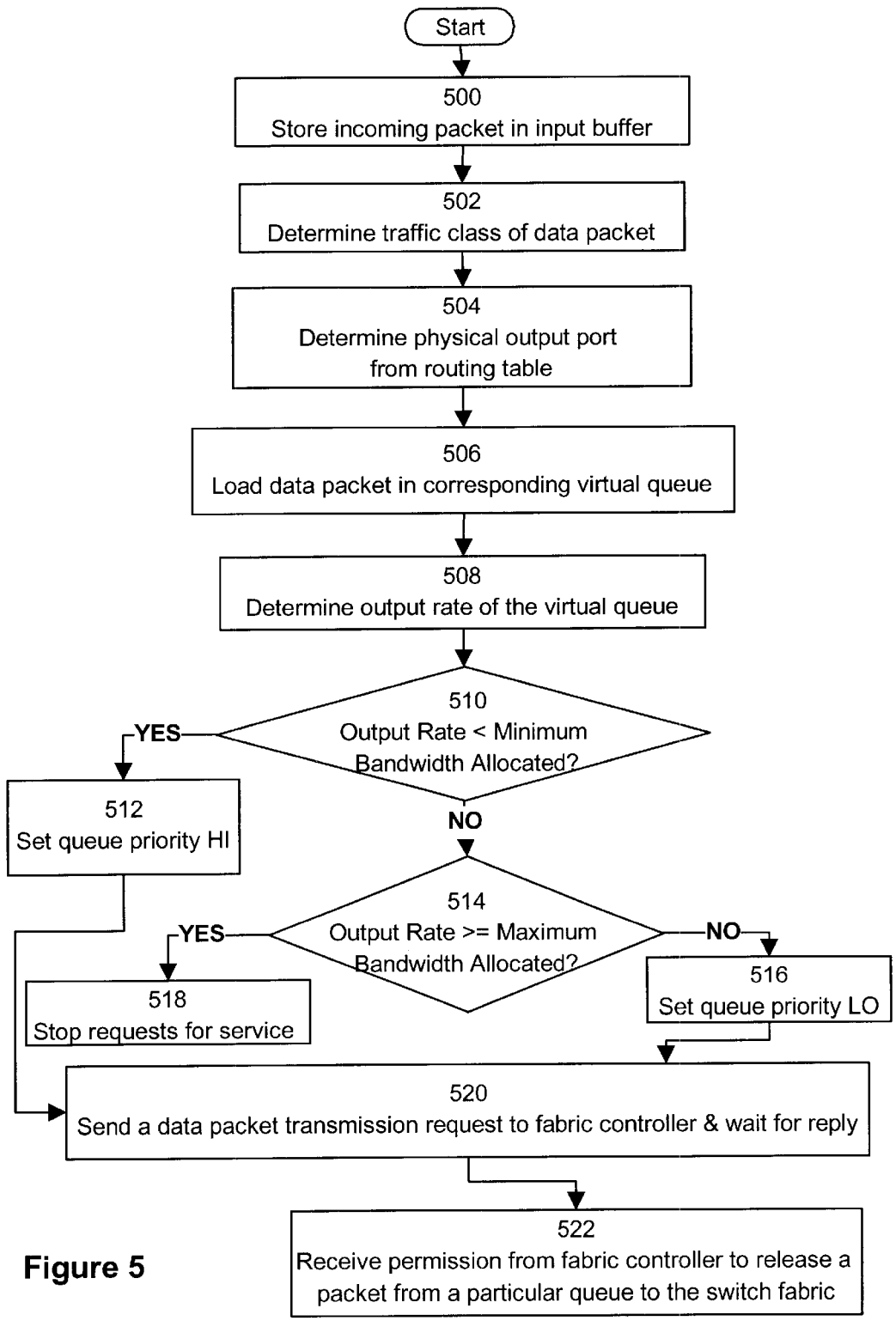
FIG. 5 is a flowchart illustrating the operation of a program element in the router depicted in FIG. 2, which controls the priority setting of requests to transmit data packets through the switch fabric.
Figure 6:
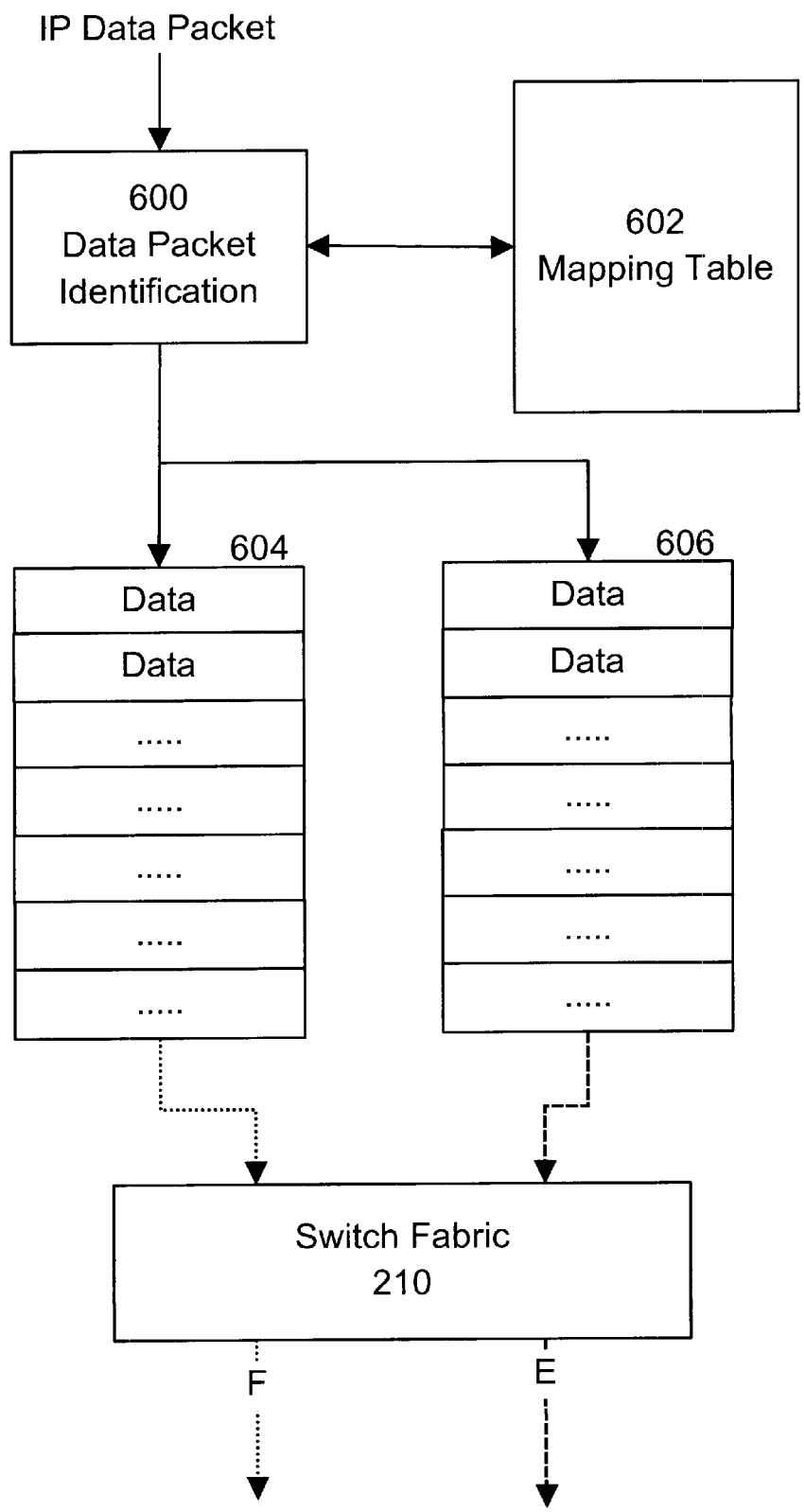
FIG. 6 is a high-level block diagram of the identification/queuing mechanism implemented in the router in accordance with this invention.

FIG. 5 provides a complete flowchart illustrating an example of the operation of the program element stored in the memory 310, and executed by the processor 308, that regulates the operation of the interface 202, in particular the priority setting of virtual queues based on their output rate. At step 500 the router receives an IP data packet. Continuing with the above example, assume that the IP data packet is received at the input port of interface 202, and placed in the input buffer 302. Control is then passed to the identification logic of the program, as illustrated by step 502, whereby the class of the IP data packet is determined to be C2. One possibility for determining the packet class is by reading the type of service (TOS) field in the IP data packet header, seen in FIG. 7. Alternatively, the class could be determined by inspecting the destination address, the source address, or the combination of source and destination addresses, among other existing elements that can from convention designate the traffic class. Next, control is passed to the routing logic of the program at step 504. The routing logic reads the destination address of the IP data packet from the destination address field in the header and consults the routing table. The table indicates the address of the output port through which the IP data packet is to be dispatched so as to reach the desired destination. At step 506, the program element transfers the IP data packet to its corresponding virtual queue by consulting a mapping table held in memory. The block diagram of this mechanism is shown in FIG. 6. The table 602 maps variables traffic class, input port and output port, to a particular virtual queue, as each particular class of traffic going to a particular output port requires its own virtual queue. If, upon consultation, the three variables do not correspond to a virtual queue already set up in memory, a new queue is dynamically created. Specific to the example described above, queue 604 is set up for C1 traffic arriving at input port A and going to output port F, and queue 606 is set up for C2 traffic arriving at input port A and going to output port B. The program element then determines the output rate of the queue at step 508 and, at step 510, compares this measured value to the queue's minimum and maximum allocated bandwidth values, as found stored in a configuration table in the memory 310. Based on the result of the comparison, the queue's priority is set to either HI at step 512, or LO at step 516. Assume for this example that the comparison at step 510 led to step 512, with queue 606 being set to priority HI. At step 520, a data packet transmission request for queue 606 is sent to the fabric controller, after which the program element must wait for a reply. At step 522, a message arrives from the fabric controller, instructing input port A to release a data packet from queue 606 to the switch fabric 210. The switch fabric then routes the packet over its logical pathway to the appropriate output port, in this case output port E, as illustrated by FIG. 6.

Specific to a multi-link trunk situation, in other words when the router logical output ports consist of multiple physical output ports, additional control is required to specify which physical output port is to be used. The routing table described above would initially indicate which logical output port was to be used, and all queueing and accounting would be done for this logical port. However, an additional mechanism within the router is provided to spread the traffic across all of the physical ports for the particular logical output port. Control would pass to this mechanism prior to a data packet transmission request being sent to the fabric controller, the request therefore being for a specific physical port but with the priority of the queue for the logical port.

The above priority-based bandwidth allocation method, where multiple classes of traffic flow through a network, can be further extended in order to implement multiple layers of allocated bandwidth. Assume the example of FIG. 1, but with both classes of traffic, C1 and C2, traveling to Maidenhead. In other words, the two different classes of data packets will be using the same logical pathway within the switch fabric, arriving at input port A of the router D for transmission through the switch fabric 210 to output port E. Also assume that the egress bandwidth allocated to the logical pathway between ports E and A is 10 Mb/s. As this fraction of bandwidth will be shared between the two different classes of traffic, it must be further subdivided to allow 5 Mb/s to each class, with competition for overflow within the 10 Mb/s total. The same two virtual queues 604 and 606 will be set up by the program element, and the same output rate accounting will be performed in order to set their priority accordingly. The main difference comes from the fact that local scheduling at the input port is performed by the program element on the two queues, prior to data packet release requests being made of the fabric controller 208. The program element will use priority sensitive multiplexing to allow for competition between the two queues for the 10 Mb/s total egress bandwidth allocated.

The priority-based bandwidth allocation method can also be extended to allow for inter-port communication. Without inter-port communication, the complications of inter-port communication protocols are avoided and a simple static configuration table of allocated bandwidth minimums and maximums can be used. The inclusion of dynamic configuration tables, local to each input port, inter-port competition for flexible outgoing link bandwidth could take place. In such a case, the input ports would have to negotiate and exchange information between one another in order to ensure that the total amount of bandwidth allocated to a particular class of traffic traveling to a particular outgoing link is not exceeded.

Figure 9:
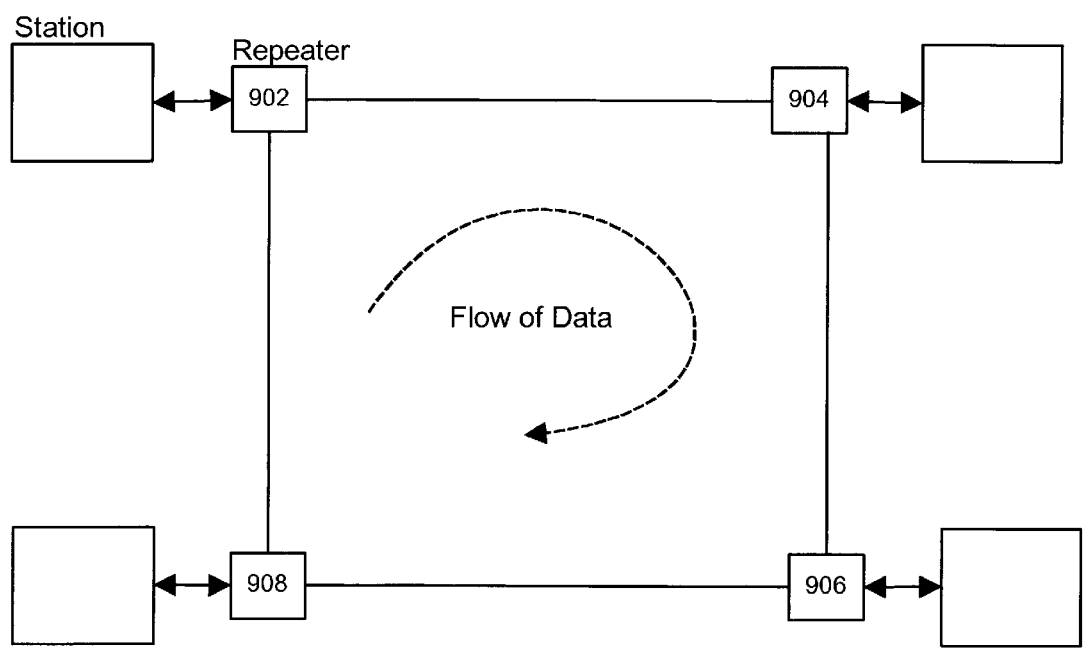
FIG. 9 is a block diagram of a general ring topology.

In an alternative embodiment of this invention, the switch fabric 210, rather than being modeled after a large space crossbar switch, consists in a common medium transport fabric establishing two counter-rotating, ring-shaped paths. This architecture of the switch fabric 210, which interconnects interfaces 202, 204 and 206, supports the priority-based bandwidth allocation method as described above, and is based on the concept of a ring topology, which is shown in FIG. 9. This topology provides a set of nodes 902, 904, 906 and 908, joined by point-to-point link sections in a closed loop. The nodes implement a number of functions. One of those functions is the repeater function. Generally, a repeater is capable of receiving data on one link section and transmitting it, bit by bit, on the other link section as fast as it is received, with no buffering at the repeater. The link sections are unidirectional; that is, data packets are transmitted in one direction only.

In the case of a ring-based switch fabric 210, the fabric controller 208, as seen in FIG. 2, is no longer required as a component of the router. The local controller of each interface, for instance controller 308 of interface 202, takes on full responsibility for supporting priority such that it will move traffic from high priority requests before traffic from low priority requests. It is therefore the local controllers which ensure that data units get from input port to output port within the router.

Structurally, each interface (202, 204 and 206) forms a node. Stated otherwise, a node comprises an input port and an output port and thus has the ability to admit data blocks to the switch fabric and to remove data blocks from the switch fabric.

Various protocols can be used to allow data transfer from one node to another node of the switch. The preferred mode is to send the data in blocks, each block being organized in a frame that contains source and destination address fields, as well as other control information and user data fields. The source and destination address information stored in the corresponding fields of the data block frame are used to identify the originating node and the destination node respectively. As to the user data field, it can contain any suitable (pay load) information that needs to be transmitted. For instance, if interface 202 forwards an IP data packet to the interface 204, the IP data packet is encapsulated in a data block frame and the data block transmitted to the interface 204. The encapsulation process consists of appending at the interface 202 to the IP data packet the necessary information fields, such as the source and destination address fields. As to the IP data packet, it occupies the user data field of the frame.

The program element described above and executed by the controller 308 is designed to automatically perform the assembly of the data blocks when data needs to be sent to another node of the router. Similarly, when a data block is received from another node the program element effects the necessary data conversion to strip away the extraneous information and retain only what is necessary, typically the user data, as the rest of the information provided in the data block is no longer required once the block has been delivered to its destination.

Since multiple devices share the ring-shaped paths, some form of medium access logic is needed to control the order and timing of data block transmissions. The interfaces 202, 204 and 206 are also designed to accommodate this functionality which is a standard requirement in the art of networks and for that reason does not need to be described in detail.

Figure 10:
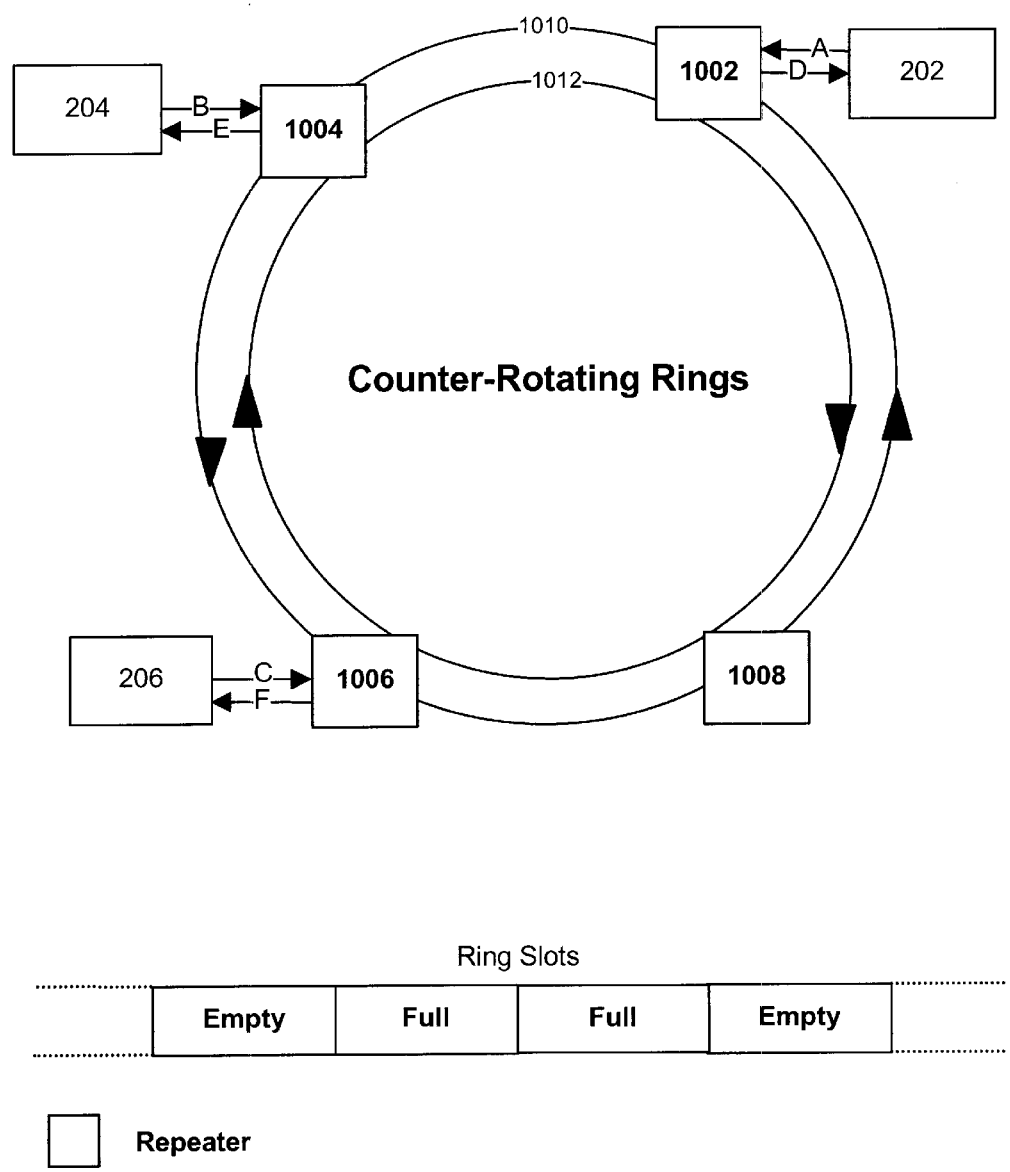
FIG. 10 is a block diagram of a ring-based transport fabric in accordance with this invention.

The ring-based switch fabric 210 comprises a data transmission link that forms two paths with opposite data transport directions (two counter-rotating rings) as seen in FIG. 10, specifically ring-shaped path 101 and ring-shaped path 1012. In a most preferred embodiment, a different physical link is used to establish each ring-shaped path. Alternatively, it is possible to implement the two ring-shaped paths over a single physical line. Regardless, both paths are used to forward data blocks between nodes, as well as to send control messages between nodes, with path 1010 transporting data in a counter-clockwise direction and path 1012 transporting data in a clockwise direction. The choice of which path to use for traffic forwarding is based on the shortest path between input and output port. Therefore, data blocks will circulate in opposite directions on the two paths. Control messages for one path travel upstream on the other path, intermixed with data packets. Another alternative involves the use of more than two ring-shaped paths for the ring-based switch fabric 210, in order to benefit from a greater amount of bandwidth for data transport between nodes. Such an alternative is also included within the scope of this invention.

The choice of the path over which data should be sent from one node to another is made on the basis of the relative positions of the nodes, in order to take advantage of the shortest route available for transmission. A potential simple implementation is to provide each node with a table, stored in interface memory, which maps originating node/destination node pairs to the corresponding path that establishes the shortest route. Therefore, when a node has data to send, either a control message or data packets, the table is consulted and the entry corresponding to the destination node found. The path to be used for the data transmission, specifically either ring 1010 or ring 1012, is then known. Alternative implementations for the determination of shortest transmission path do exist, and are included within the scope of this invention.

Data is transmitted over each ring-shaped path by multiplexing. Each data packet is assigned a time slice or slot as depicted at FIG. 10. Once a slot is filled, the data it holds will definitely be delivered to its destination. In other words the path is non-lossy. When the data packet is delivered the slot is made empty and available for new data. Multi-destination traffic (multi-cast) is left to circulate on the ring. In this case, the data packets can be copied by each destination port into local buffers, but can only be removed from the ring slots by the original source.

Although traffic to any destination may be put into any empty slot, upstream nodes can potentially use up all of the empty slots before the slots reach downstream nodes. As a result, negotiation is needed within the switch fabric in order to get upstream nodes to leave empty slots for downstream nodes, otherwise system efficiency will be decreased. For example, if upstream nodes do not leave any empty slots for downstream nodes, a system where priority is used to manage bandwidth allocation will experience troubles as input ports attached to downstream nodes may not be able to achieve their allocated minimum bandwidth. This negotiation is achieved through the control messages sent from neighbor to neighbor.

Specific to this particular embodiment of the current invention, router D also includes an admission control system responsible for regulating the usage of the transport fabric paths. Since all traffic being sent from any one of the router's input ports to any one of the router's output ports must travel on one of the two rings-shaped paths, the slot usage regulation for those rings-shaped paths is applied to each input port connected to the rings, and consists in a message-based cooperative relationship between all such ports, to be described below. The system ensures an efficient distribution of path usage between all input ports, thus allowing a non-blocking transmission between all router input and output ports.

The admission control system structurally includes the plurality of local controllers of the interfaces 202, 204 and 206 as well as the transport fabric ring-shaped paths 1010 and 1012. From a functional point of view, the admission control system can be presented as a collection of dependent admission control mechanisms, each associated with a particular input port of a node connected to the transport fabric ring-shaped paths. Each separate control mechanism is responsible for cooperating with all of the other control mechanisms in order to ensure the slot usage regulation on the transport fabric rings 1010 and 1012.

Figure 11:
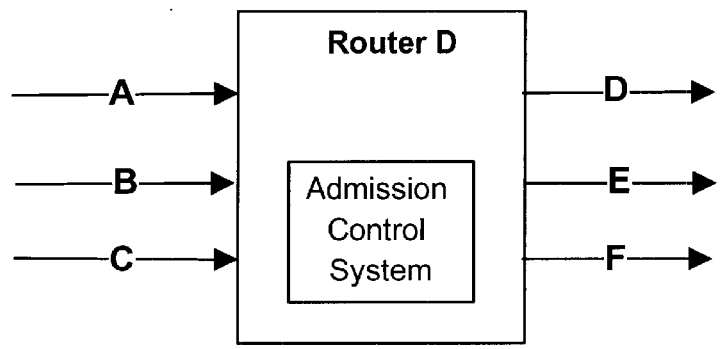
FIG. 11 is a functional block diagram of an admission control system, in accordance with this invention.
Figure 11:
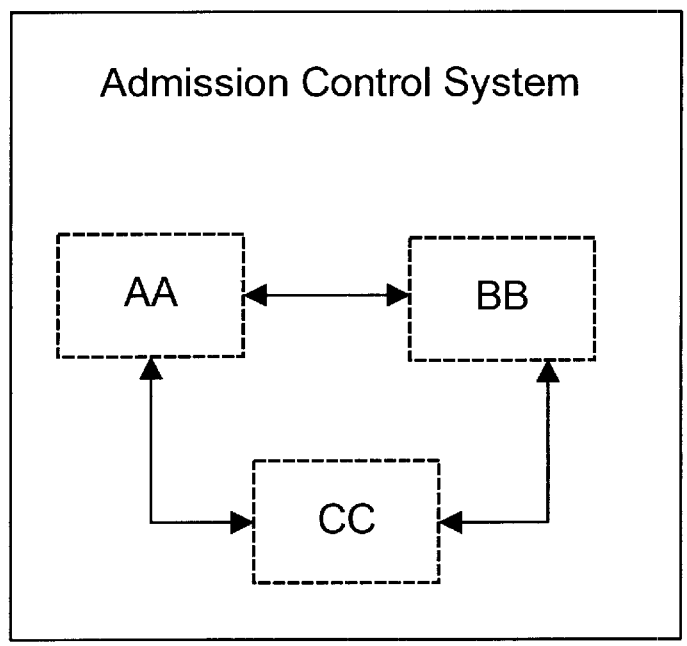
Figure 11:

FIG. 11 is a functional block diagram of the admission control system for router D and its three input ports A, B and C. There are three separate admission control mechanisms, AA, BB and CC, each one dependent on the other two. Conceptually, each admission control system resided on the node of the input port with which the admission control system is associated. The admission control system functionality is implemented by software executed by the local controller of each interface 202, 204 and 206, as briefly mentioned earlier.

The negotiation between router input ports is supported by a cooperative relationship between the ports. It is the messages sent from node to node on the ring-shaped paths, an integral part of the admission control system, which allow the ingress-defined priority data settings to be supported by the transport fabric. This negotiation between input ports may be based on two methods, the scalar method or the vector method, although alternatives do exist and fall within the scope of this invention. Examples of both methods will be provided below.

In a preferred embodiment of this invention, the ring-shaped transport fabric uses the scalar method for negotiation. Any input port will send upstream an indication of how many empty slots it needs to empty its queues enough to not only achieve its own allocated minimum bandwidth, but also to provide for its downstream ports. Through looped back control messages containing time stamps, any one input port can determine the round-trip time of travel TT between itself and its downstream input port.

Typically, the TT value for each input port or node can be established when the system powers up or can be periodically assessed to keep this value as accurate as possible. The procedure consists for each port to send to its downstream neighbor a message including a control data element that instructs the neighbor to respond by returning the user data part of the message toward the message originator. The original message contains a time stamp and that time stamp is sent back to the message originating node. By comparing the time stamp with the system time the TT value can be derived.

At time t0 each node starts counting how many empty time slots have been passed in the direction of the downstream node during a period equal to the TT value; any full slots destined to become empty at a downstream node are also considered as empty slots. Upon receipt of a request for empty slots from the downstream node, the node will subtract from the requested number the number of empty slots already sent. After the subtraction, the resultant number is added to the input port's own number of empty slots required to meet its own allocation, and this total is sent as a request to the next upstream neighbor. Admission control at the input ports ensures that the totals of guaranteed bandwidth are well under the total available bandwidth between the neighbors. Each node is capable of throttling the admission of data blocks in order to free, if required, empty slots for use by the downstream nodes.

Taking the example of router D and its interface 202, the round-trip time of travel TT between the node containing input port A and a neighbor can be determined as follows. Input port A includes its own timestamp in a message, and sends it to the neighbor. Upon receipt, the neighbor simply loops the message back to input port A, where the original timestamp can be subtracted from the current system time to determine the round trip delay TT. This value is then maintained in memory 310, in a static table which maps to each of the node's two neighbors a unique time of flight TT.

The empty slot transmission history for input port A is also maintained in memory 310. A potential structure for maintaining this history is a dynamic table mapping the number of free slots sent to the time at which the transmission of these slots was made. Upon receipt of a request from the neighbor at real time RT, the controller 308 subtracts the appropriate TT from RT in order to determine the starting time ST to use for consulting the history table. The time ST corresponds to the time after which all free slots sent to the downstream neighbor would not be accounted for in the neighbor's request sent to input port A, as they would have still been in transmission on the ring when the neighbor determined and sent the request. The controller 308 deletes from the history table any entries with a transmission time earlier than ST and totals the number of free slots passed downwardly since ST. This total value is then subtracted from the value requested by input port B, the resultant value taken to be the number of free slots actually required by input port B in order to achieve its own minimum allocated bandwidth as well as to provide for its downstream ports. Alternative solutions exist for maintaining the free slot transmission history, for instance a dynamic table which simply keeps a history of all empty slots sent during the last period of time which is equal to the round trip time TT to the neighbor. This would cover slots sent that the neighbor hadn't seen when it generated the request plus slots sent since it generated the request but before the local port received it. Such alternative solutions are also within in the scope of this invention.

Figure 12:
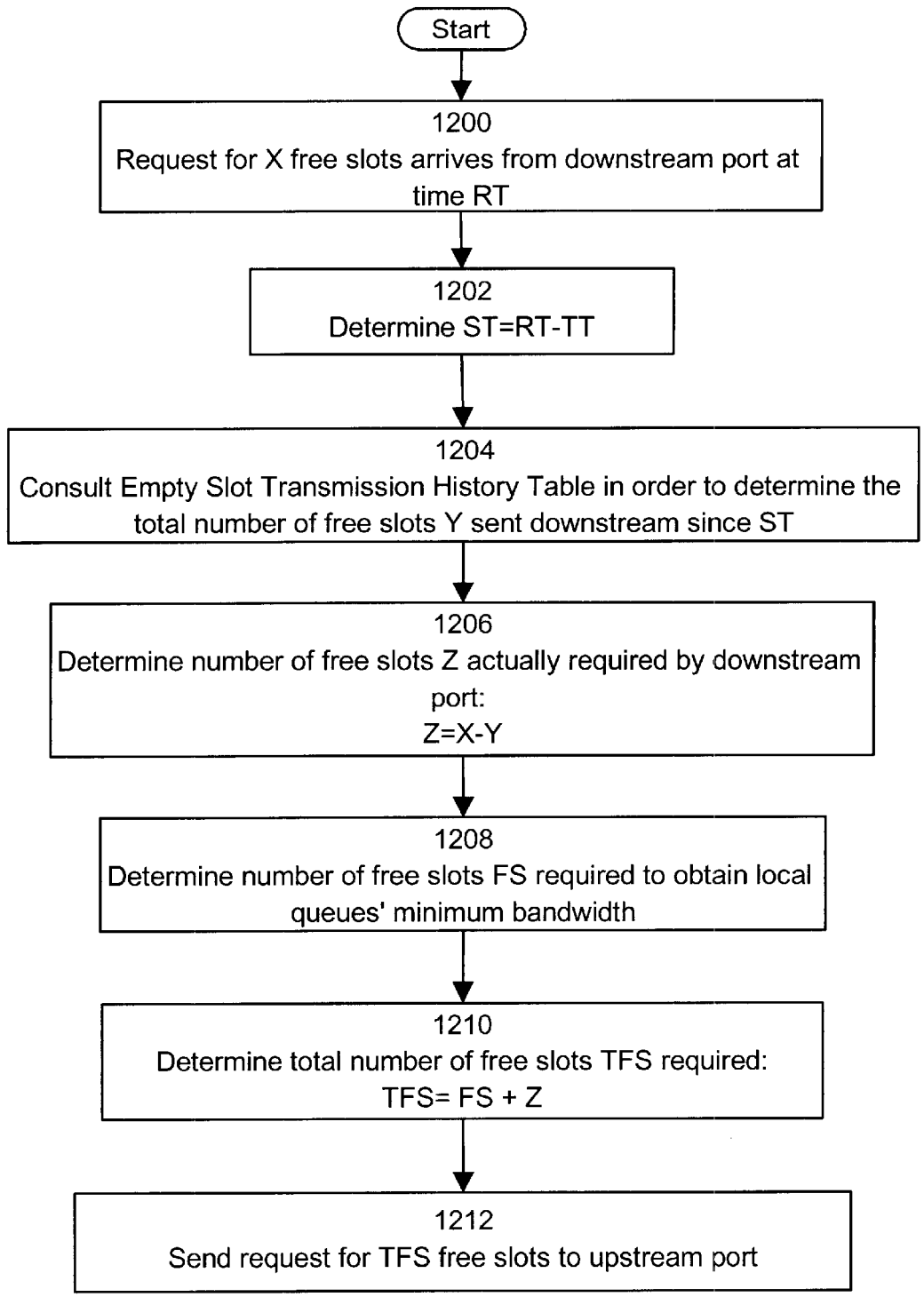
FIG. 12 is a flow chart illustrating the operation of a program element in the router interface depicted in FIG. 3, which implements the admission control system's scalar negotiation method, in accordance with this invention.

As a detailed example of the scalar negotiation method, assume that the node containing input port A at interface 202 receives a request from the node containing input port B at interface 204 for 10 free slots, the request control message arriving on path 1012. FIG. 12 provides a corresponding flowchart illustrating the operation of the program element stored in the memory 310, and executed by the controller 308, that regulates the operation of the interface 202, in particular the instructions which contribute to the scalar negotiation admission control system. At step 1200, a request arrives at input port A from input port B for X=10 free slots at time RT. Control then passes to the identification logic, which determines the start time ST as being the time of travel TT between ports B and A subtracted from the request time of arrival RT. At step 1204, the input port A empty slot transmission history table is consulted, held in memory 310. All entries with a time tag earlier than ST are deleted from the table. All entries with a time tag later than ST are summed together in order to determine the total number Y of free slots previously sent downstream toward input port B. Assume that the history table shows that since ST 3 free slots and one filled slot with destination output port E have been sent downstream, for a total of Y=4 free slots sent downstream. The actual number of free slots required by input port B is determined at step 1206, specifically Z=10−4=6 free slots. At step 1208, the program element determines the number of free slots FS required to obtain the minimum bandwidth for input port A's local queues, based on the accounting performed and bandwidth configuration established by the priority-based transmission scheme. Assume for this example that FS=20 free slots. The addition of FS and Z at step 1210 results in TFS=20+6=26, the total number of free slots required by input port A in order to achieve its own allocated minimum bandwidth as well as to provide for its downstream neighbours. At step 1212, input port A sends a request for 26 free slots to its own upstream neighbour on ring 1012.

In another preferred embodiment of this invention, the ring-based transport fabric uses the vector method for negotiation. The request message sent on path 1012 is in the form of a vector where each element contains the unique identity of an input port or node, as well as its request for free slots. For example, in router D's 3-node rings, the request might look like this: PortA,34;PortB,5;PortC,20, indicating that input port A needs 34 free slots, B needs 5 free slots, and C needs 20 free slots in order to obtain their minimum allocated bandwidths. Each input port will add (or replace) its own element in the vector, but it is not necessary for all input ports to have an appearance in the vector. A particular input port will keep a history of slots sent, or passed on, to other ports during the most recent time of travel TT period. For example, input port B's history could look like portC,16;PortA,17, indicating that in the last TT period it sent or passed on 16 slots to port C and 17 slots to port A. It is important to note that a full slot sent to port C will become a free slot between port C and port A, and therefore this must be taken into account when processing the request vector, in order to properly calculate the commitment an input port must make to pass free slots through. Each element in the vector can be modified by subtracting the free slots already generated during the time travel. The oldest (most downstream) element is modified first and if it reaches zero, then the next oldest will be modified. There can be multiple request messages in travel on the ring; however, an input port must not send messages too often, rather holding information from incoming request messages, and aggregate information from multiple messages, until it is entitled to send one itself. If an input port has not received any incoming messages for some time, but does have a request to make for itself, the input port is obliged to send a message.

The round-trip time of travel TT between an input port and its downstream neighbour is determined as above for the scalar negotiation method, specifically through a looped back control message containing a time stamp. The empty slot transmission history for a particular input port is also maintained as above, potentially through a dynamically updated table, stored in local memory, which maps the number of free slots generated to the time at which they were transmitted. In addition to these similarities to the scalar negotiation method, the vector negotiation method also maintains a full slot transmission history for each input port. A possible structure for this history may be a dynamic table stored in local memory, for instance memory 310 for input port A of router D, mapping the three variables: number of full slots sent or passed on, destination port and time of transmission. When a request arrives at an input port at time RT, the start time ST is determined by subtracting TT from RT. Subsequently, any entries in the full slot transmission table with a time stamp earlier than ST are deleted from the table. The remaining entries are summed by destination port, in order to determine how may slots have been sent or passed on to each different input port in the last time of flight period. Alternative solutions exist for processing the request vector in order to determine the full and free slot transmission histories, and these solutions are included in the scope of this invention.

Figure 13:
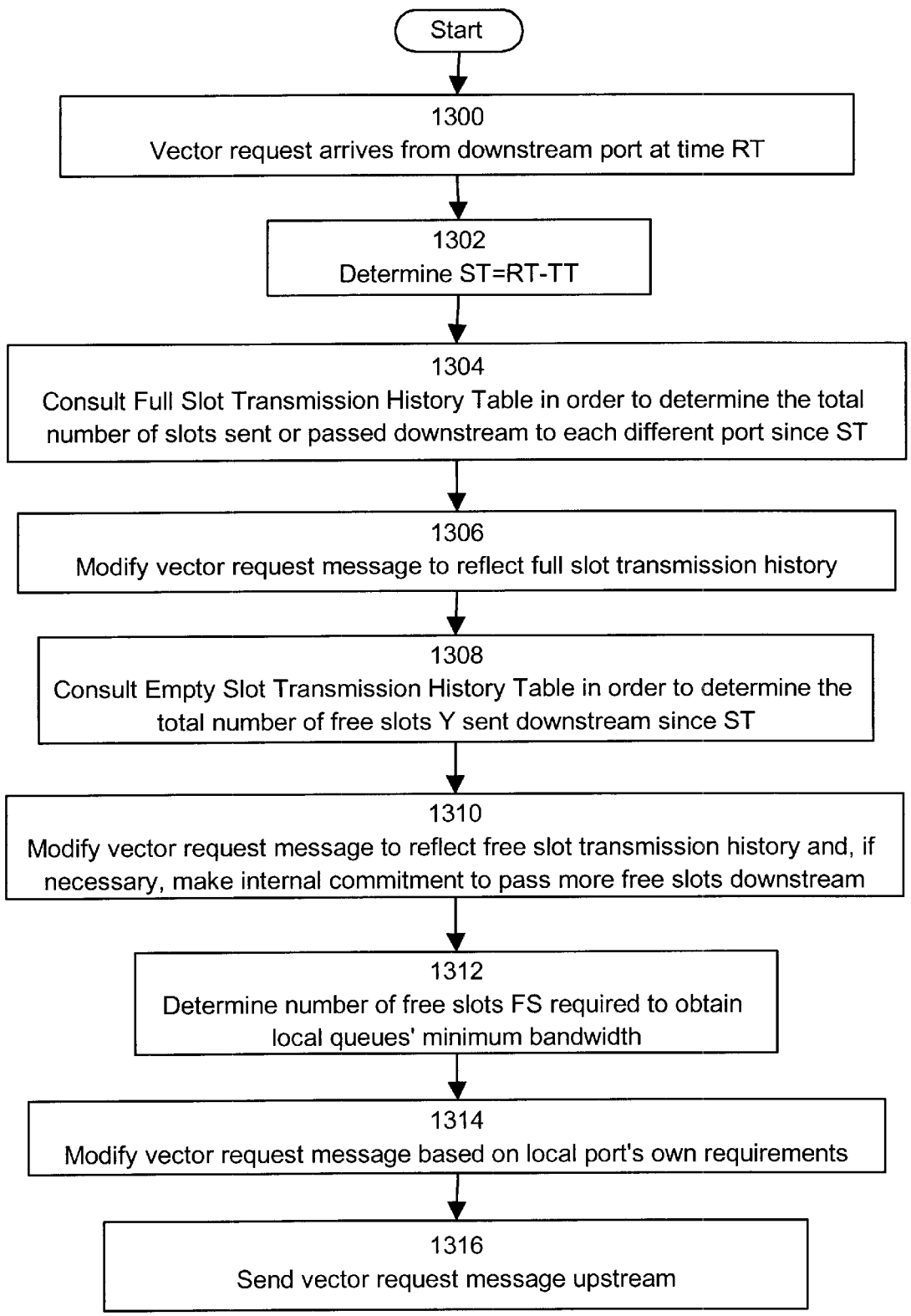
FIG. 13 is a flow chart illustrating the operation of a program element in the router interface depicted in FIG. 3, which implements the admission control system's vector negotiation method, in accordance with this invention.

As an example of the vector negotiation method, assume that input port A at interface 202 receives a vector request message from input port B on ring 1012, specifically the vector portB,5;PortC,20. FIG. 13 provides a corresponding flowchart illustrating the operation of the program element stored in the memory 310, and executed by the controller 308, that regulates the operation of the interface 202, in particular the instructions which contribute to the vector negotiation admission control system. At step 1300, the request message arrives at input port A on ring 1012, at time RT. Control then passes to the identification logic, which determines the start time ST as being the time of travel TT between ports B and A subtracted from the request time of arrival RT. At step 1304, the input port A full slot transmission history table is consulted, held in memory 310. All entries with a time tag earlier than ST are deleted from the table. For all entries with a destination port B, the number of slots sent or passed on are summed together in order to determine the total number YB of full slots previously sent or passed on downstream. Assume that the history table shows that, since time ST, YB=2 full slots have been sent or passed on to input port B. The same calculation is performed on the entries with destination port C, and assume that YC=3. At step 1306, the vector request message is modified to reflect these calculations, becoming Port B,3;PortC,17. At step 1308, the program element consults the free slot transmission history table in order to determine the number of free slots Y sent downstream since ST. Once again, any tables entries which have a timestamp earlier than ST are deleted, the remaining entries summed together to determine Y, assumed to be 3 for this example. At step 1310, the vector request message is again modified by subtracting Y from the number of requested slots, beginning with the oldest (most downstream) element, in this case PortC. The request vector becomes PortB,3;PortC,14. At this point, input port A makes an internal commitment to pass more free slots through in order to accommodate input port C's slot requirements. Next, at step 1312, the program element determines the number of free slots FS required to obtain the minimum bandwidth for input port A's local queues, based on the accounting performed and bandwidth configuration established by the priority-based transmission scheme. At step 1314, the vector request message is modified for the third and final time, in order to add input port A's element, becoming PortA,15;PortB,3;PortC,14. At step 1316, input port A sends the vector request message upstream on ring 1012.

Irrespective of the method of inter-node negotiation used in order to regulate the usage of the ring-based switch fabric 210, the actual introduction of data blocks in the ring-shaped paths is effected by each node by simply loading empty slots that pass by with data. However, the number of slots that are filled by each node is controlled so as to leave enough empty slots to satisfy the needs of the downstream nodes. Each node is therefore provided with a mechanism which provides control over the rate at which data is introduced in the ring-shaped pathways. This control mechanism may take advantage of the different types of traffic classes flowing through the network, as well as of the set of predetermined bandwidth configuration settings stored in the local memories of each node interface.

An example of the control mechanism, provided to each node attached to the ring-shaped paths and used to control the rate at which data is introduced in the ring-shaped pathways, is depicted by continuing with the above example of C2 traffic arriving at input port A of router D, for transport over the ring-shaped paths to output port E. Assume that input port A has received from its downstream node a request for 20 free slots. Also assume that the accounting operation performed on virtual queue 606, held in memory 310, has determined that the C2 traffic's data rate at input port A is currently at 4 Mb/s, well over its minimum allocated bandwidth of 1 Mb/s. The queue is therefore making LO priority requests, and competing for spare bandwidth, acceptable up to a maximum of 5 Mb/s data rate. In order to support the downstream node's need for 20 free slots in order to achieve its own minimum bandwidth, the input port A will make an internal commitment to allow more free slots to go through by restricting its own data rate to its minimum allocated bandwidth of 1 Mb/s, thereby temporarily stopping all LO priority requests, and consequently its own usage of any free slots. Alternative types of control mechanisms, used to control the rate at which data is introduced in the ring-shaped pathways, do exist, and are included within the scope of this invention.

The above description of a preferred embodiment under the present invention should not be read in a limitative manner as refinements and variations are possible without departing from the spirit of the invention. The scope of the invention is defined in the appended claims and their equivalents.

We claim:

1. A switch for processing data units, said switch including:
   a plurality of input ports, each input port capable of receiving data units;
   a plurality of output ports, each output port capable of releasing data units;
   a switch fabric capable of selectively establishing a plurality of logical pathways between said input ports and said output ports, each logical pathway connecting a certain input port to a certain output port, whereby a data unit received at the certain input port can be transported to the certain output port on the logical pathway between said certain output port and said certain input port;
   a plurality of bandwidth control mechanisms, each bandwidth control mechanism being associated with a different logical pathway established through said switch fabric, each bandwidth control mechanism operative to:
   a) compute a bandwidth usage of the respective logical pathway; and
   b) regulate the transport of data units over the respective logical pathway on a basis of the computed bandwidth usage.

2. A switch as defined in claim 1, wherein said switch is a router.

3. A switch as defined in claim 2, wherein said switch includes an independent bandwidth control mechanism for each logical pathway established through said switch fabric.

4. A switch as defined in claim 3, wherein each bandwidth control mechanism regulates bandwidth usage over a respective logical pathway independently from the regulation of bandwidth usage over a different logical pathway.

5. A switch as defined in claim 4, wherein each bandwidth control mechanism comprises a queue for storage of data units to be transported over the logical pathway associated with the bandwidth control mechanism.

6. A switch as defined in claim 5, wherein each bandwidth control mechanism includes a queue control unit for regulating a rate of data packets released from said queue over the logical pathway associated with the bandwidth control mechanism.

7. A switch as defined in claim 6, wherein said queue control unit is capable of performing an accounting operation to determine bandwidth usage as a result of releasing data packets from said queue.

8. A switch as defined in claim 7, wherein said queue control unit is capable of computing an average bandwidth usage value when performing an accounting operation.

9. A switch as defined in claim 8, wherein said queue control unit prevents release of data units from said queue when said average bandwidth usage value exceeds a certain threshold.

10. A switch as defined in claim 9, wherein said queue control unit alters a priority setting of said queue when said average bandwidth usage value exceeds a certain threshold.

11. A switch as defined in claim 1, wherein said data units are IP data packets.

12. A switch as defined in claim 6, wherein said switch fabric includes a switch fabric controller to regulate the transport of data units through respective logical pathways of said switch fabric.

13. A switch as defined in claim 12, wherein said queue control unit is capable of issuing a request for data release signal to said switch fabric controller to request authorization from said switch fabric controller to release a data packet from said queue to said switch fabric.

14. A switch as defined in claim 13, wherein said queue control unit is responsive to an authorization for data release signal from said switch fabric controller to release a data packet from said queue to said switch fabric.

15. A switch as defined in claim 14, wherein said request for data release signal includes priority information.

16. A switch as defined in claim 15, wherein said priority information establishes a right of preeminence to gain access to said switch fabric relative to other request for data release signals from queues associated to different logical pathways.

17. A switch as defined in claim 16, wherein said priority information is indicative of at least two priority levels.

18. A switch as defined in claim 17, wherein said queue control unit sets the priority level of said request for data release signal in dependence of bandwidth usage of said queue.

19. A switch as defined in claim 18, wherein said queue control unit is capable of performing an accounting operation to determine bandwidth usage as a result of releasing data packets from said queue.

20. A switch as defined in claim 19, wherein said queue control unit is capable of computing an average bandwidth usage value when performing an accounting operation.

21. A switch as defined in claim 20, wherein said queue control unit is capable of setting the priority level of said request for data release signal at either one of first and second levels, said first level being indicative of a higher priority than said second level, said queue control unit setting the priority level of said request for data release signal at said first level when said average bandwidth usage is less than a certain threshold.

22. A switch as defined in claim 21, wherein said queue control unit sets the priority level of said request for data release signal at said second level when said average bandwidth usage exceeds said certain threshold.

23. A method for managing the transport of data units in a switch, said switch comprising:
  a plurality of input ports, each input port capable of receiving data units;
  a plurality of output ports, each output port capable of releasing data units;
  a switch fabric capable of selectively establishing a plurality of logical pathways between said input ports and said output ports, each logical pathway connecting a certain input port to a certain output port, whereby a data unit received at the certain input port can be transported to the certain output port on the logical pathway;
  for a particular logical pathway, said method comprising the steps of:
    a) computing a bandwidth usage of the particular logical pathway; and
    b) regulating the transport of data units over the particular logical pathway on a basis of the bandwidth usage computed in step a.

24. A method as defined in claim 23, wherein said switch is a router.

25. A method as defined in claim 24, comprising the step of providing said switch with an independent bandwidth control mechanism for each logical pathway established through said switch fabric.

26. A method as defined in claim 25, wherein each bandwidth control mechanism comprises a queue for storage of data units to be transported over the logical pathway associated with the bandwidth control mechanism.

27. A method as defined in claim 26, wherein each bandwidth control mechanism includes a queue control unit for regulating a rate of data packets released from said queue over the logical pathway associated with the bandwidth control mechanism.

28. A method as defined in claim 27, wherein said queue control unit is capable of performing an accounting operation to determine bandwidth usage as a result of releasing data packets from said queue.

29. A method as defined in claim 28, wherein said queue control unit is capable of computing an average bandwidth usage value when performing an accounting operation.

30. A method as defined in claim 29, wherein said queue control unit stops releasing data units from said queue when said average bandwidth usage value exceeds a certain threshold.

31. A method as defined in claim 30, wherein said queue control unit reduces a rate of data units released from said queue when said average bandwidth usage value exceeds a certain threshold.

32. A method as defined in claim 23, wherein said data units are IP data packets.

33. A switch for processing data units, said switch including:
  a plurality of input ports, each input port capable of receiving data units;
  a plurality of output ports, each output port capable of releasing data units;
  a switch fabric capable of selectively establishing a plurality of logical pathways between said input ports and said output ports, each logical pathway connecting a certain input port to a certain output port, whereby a data unit received at the certain input port can be transported to the certain output port on the logical pathway associated to said certain output port and to said certain input port;
  means responsive to establishment of a logical pathway through said switch fabric to enable a bandwidth control mechanism to:
    a) compute a bandwidth usage of the logical pathway; and
    b) regulate the transport of data units over the logical pathway on a basis of the computed bandwidth usage.

34. A switch as defined in claim 33, wherein said switch is a router.

35. A switch as defined in claim 34, wherein said means responsive to establishment of a logical pathway through said switch fabric enables an independent bandwidth control mechanism for each logical pathway established through said switch fabric.

36. A switch as defined in claim 35, wherein each bandwidth control mechanism regulates bandwidth usage over a respective logical pathway independently from the regulation of bandwidth usage over a different logical pathway.

37. A switch as defined in claim 36, wherein each bandwidth control mechanism comprises a queue for storage of data units to be transported over the logical pathway associated with the bandwidth control mechanism.

38. A switch as defined in claim 37, wherein each bandwidth control mechanism includes a queue control unit for regulating a rate of data packets released from said queue over the logical pathway associated with the bandwidth control mechanism.

39. A switch as defined in claim 38, wherein said queue control unit is capable of performing an accounting operation to determine bandwidth usage as a result of releasing data packets from said queue.

40. A switch as defined in claim 39, wherein said queue control unit is capable of computing an average bandwidth usage value when performing an accounting operation.

41. A switch as defined in claim 40, wherein said queue control unit stops releasing data units from said queue when said average bandwidth usage value exceeds a certain threshold.

42. A switch as defined in claim 41, wherein said queue control unit reduces a rate of data units released from said queue when said average bandwidth usage value exceeds a certain threshold.

43. A switch as defined in claim 33, wherein said data units are IP data packets.

44. A method for managing the transport of data units in a switch, said switch comprising:
   a plurality of input ports, each input port capable of receiving data units;
   a plurality of output ports, each output port capable of releasing data units;
   a switch fabric capable of selectively establishing a plurality of logical pathways between said input ports and said output ports, each logical pathway connecting a certain input port to a certain output port, whereby a data unit received at the certain input port can be transported to the certain output port on the logical pathway;
   in response to the establishment of a certain logical pathway through said switch fabric, said method comprising the steps of enabling a bandwidth control mechanism to:
   a) compute a bandwidth usage of the certain logical pathway; and
   b) regulate the transport of data units over the certain logical pathway on a basis of the computed bandwidth usage.

45. A method as defined in claim 44, wherein said switch is a router.

46. A method as defined in claim 45, comprising the step of establishing a given logical pathway between a given input port and a given output port when a data unit is received at said given input port and has a destination that can be reached through said given output port.

47. A method as defined in claim 46, comprising the step of enabling an independent bandwidth control mechanism for each logical pathway established through said switch fabric.

48. A method as defined in claim 47, wherein each bandwidth control mechanism comprises a queue for storage of data units to be transported over the logical pathway associated with the bandwidth control mechanism.

49. A method as defined in claim 48, wherein each bandwidth control mechanism includes a queue control unit for regulating a rate of data packets released from said queue over the logical pathway associated with the bandwidth control mechanism.

50. A method as defined in claim 49, wherein said queue control unit is capable of performing an accounting operation to determine bandwidth usage as a result of releasing data packets from said queue.

51. A method as defined in claim 50, wherein said queue control unit is capable of computing an average bandwidth usage value when performing an accounting operation.

52. A method as defined in claim 51, wherein said queue control unit stops releasing data units from said queue when said average bandwidth usage value exceeds a certain threshold.

53. A method as defined in claim 52, wherein said queue control unit reduces a rate of data units released from said queue when said average bandwidth usage value exceeds a certain threshold.

54. A method as defined in claim 53, wherein said data units are IP data packets.

55. A switch for processing data units, said switch including:
   a plurality of input ports, each input port capable of receiving data units;
   a plurality of output ports, each output port capable of releasing data units;
   a switch fabric capable of selectively establishing a plurality of logical pathways between said input ports and said output ports, each logical pathway connecting a certain input port to a certain output port, whereby a data unit received at the certain input port can be transported to the certain output port on the logical pathway between said certain output port and said certain input port;
   a plurality of bandwidth control mechanisms for regulating the transport of data units in said switch, each bandwidth control mechanism being associated with a different logical pathway established through said switch fabric, each bandwidth control mechanism including:
   a) a queue for storage of data units to be transported over the logical pathway associated with the bandwidth control mechanism; and
   b) a queue control unit for regulating a rate of data packets released from said queue over the respective logical pathway, said queue control unit being capable of performing an accounting operation to determine bandwidth usage of the respective logical pathway as a result of releasing data packets from said queue.

* * * * *